United States Patent
Gotmalm et al.

(10) Patent No.: US 11,131,191 B2
(45) Date of Patent: Sep. 28, 2021

(54) SENSING DEVICE FOR A ROCK BOLT

(71) Applicant: ALERT TECHNOLOGIES INC., Sault Ste. Marie (CA)

(72) Inventors: Christer Gotmalm, Hilton Beach (CA); Josef Robert Mankowski, London (CA)

(73) Assignee: Alert Technologies Inc.

( * ) Notice: Subject to any disclaimer, the term of this patent is extended or adjusted under 35 U.S.C. 154(b) by 462 days.

(21) Appl. No.: 16/312,665

(22) PCT Filed: Jun. 20, 2017

(86) PCT No.: PCT/CA2017/050752
§ 371 (c)(1),
(2) Date: Dec. 21, 2018

(87) PCT Pub. No.: WO2017/219134
PCT Pub. Date: Dec. 28, 2017

(65) Prior Publication Data
US 2020/0200007 A1     Jun. 25, 2020

Related U.S. Application Data

(60) Provisional application No. 62/352,827, filed on Jun. 21, 2016.

(51) Int. Cl.
*E21D 21/02*     (2006.01)
*G01L 1/04*     (2006.01)

(52) U.S. Cl.
CPC ............... *E21D 21/02* (2013.01); *G01L 1/04* (2013.01)

(58) Field of Classification Search
CPC combination set(s) only.
See application file for complete search history.

(56) References Cited

U.S. PATENT DOCUMENTS 3,111,655 A * 11/1963 Kotarsky ............... E21F 17/185
340/690
4,426,642 A * 1/1984 Poffenbarger ........ E21F 17/185
33/1 H
(Continued)

FOREIGN PATENT DOCUMENTS

CL     201102065 A1     10/2011
CN     201010905 Y     1/2008
(Continued)

OTHER PUBLICATIONS

Office Action from Chilean Patent Office for Application No. 201803694 dated Feb. 5, 2020 (summary provided) (16 pages).
(Continued)

*Primary Examiner* — Janine M Kreck
(74) *Attorney, Agent, or Firm* — St. Onge Steward Johnston & Reens LLC

(57) ABSTRACT

Rock bolts are typically used to provide support for rock formations and to hold the formation together. Rock bolts may fail due to a number of reasons. Failures in rock bolts may cause overload or loss of preload in the rock bolt. Aspects of the disclosure provide a sensing device for a rock bolt. The sensing device includes a spacer and at least one load sensor. Each said at least one load sensor includes a respective resilient compressible element that is adjacent a respective end of the spacer. The resilient compressible element compresses responsive to a respective load threshold. Each load sensor provides respective sensor output as a function of whether or not the respective resilient compressible element is compressed. The sensing device generates device output indicating a status of the rock bolt.

23 Claims, 24 Drawing Sheets

(56) References Cited

U.S. PATENT DOCUMENTS

| | | | |
|---|---|---|---|
| 5,185,595 A | 2/1993 | Friesen | |
| 5,392,654 A | 2/1995 | Boyle | |
| 5,412,582 A | 5/1995 | Hesthamar et al. | |
| 2014/0007705 A1 | 1/2014 | Campbell et al. | |

FOREIGN PATENT DOCUMENTS

| | | | |
|---|---|---|---|
| CN | 102589767 A | 7/2012 | |
| CN | 202533205 U | 11/2012 | |
| CN | 103670473 A | 3/2014 | |
| CN | 104956031 A | 9/2015 | |
| CN | 106169708 A | 11/2016 | |
| EP | 1770594 A2 | 4/2007 | |
| WO | 03033877 A1 | 4/2003 | |

OTHER PUBLICATIONS

Examination and Search Report from Chinese Patent Office for Application No. 201780050708X dated Jun. 2, 2020 (10 pages).
Supplemental European Search Report from the European Patent Office for Application No. 17814374.9 dated Feb. 4, 2020 (9 pages).

\* cited by examiner

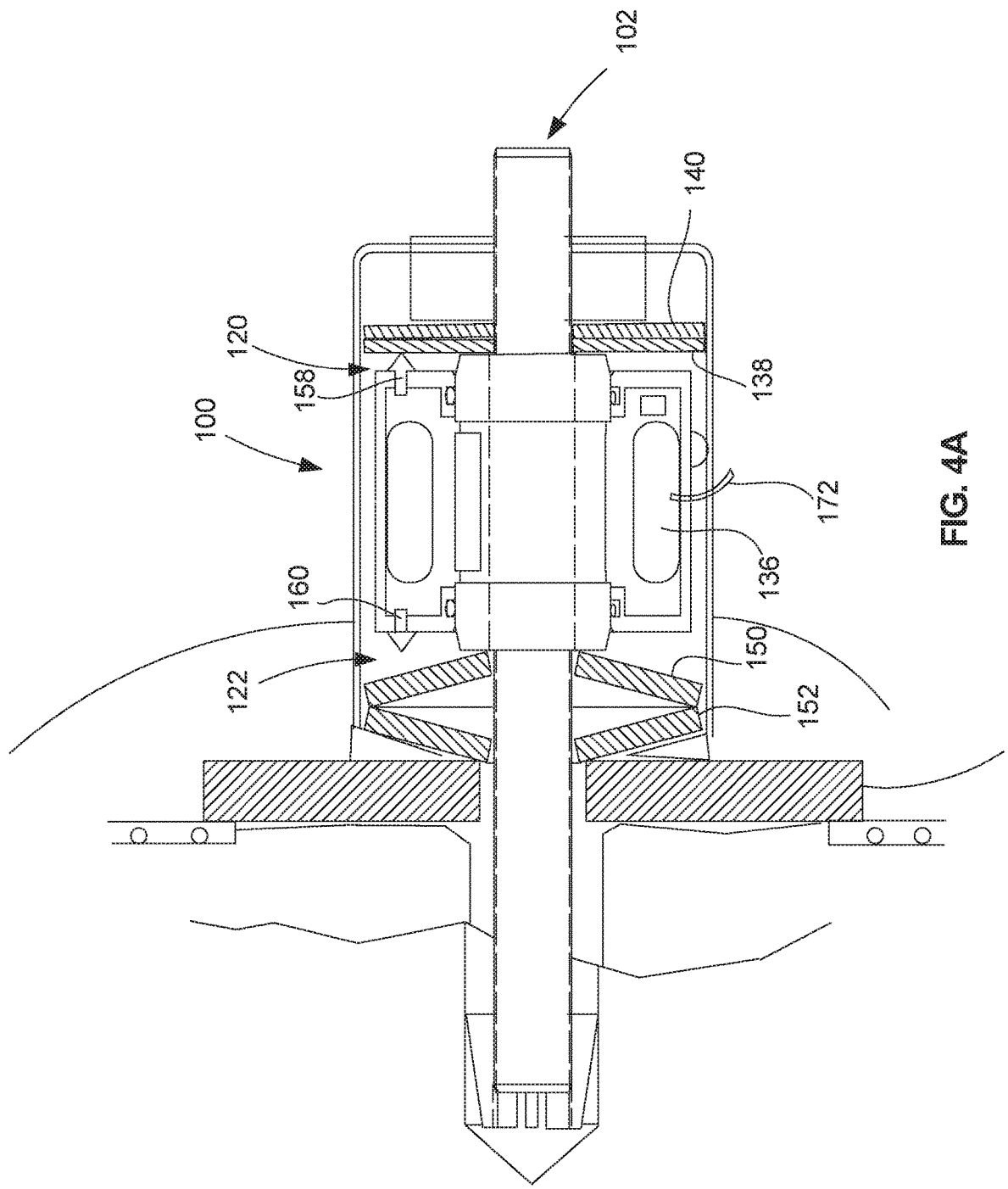

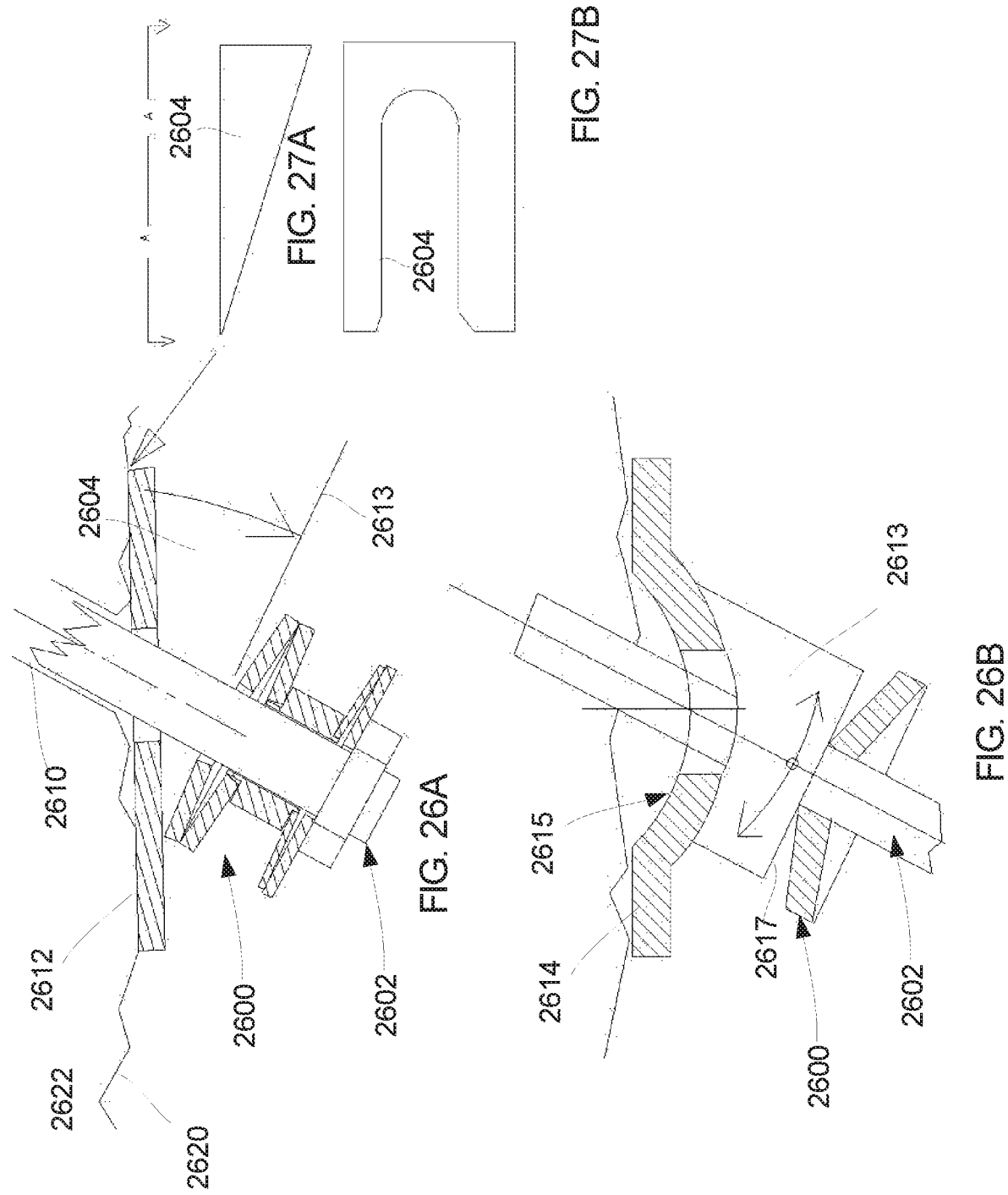

SENSING DEVICE FOR A ROCK BOLT

RELATED APPLICATION

This application claims priority to U.S. Provisional Patent Application Ser. No. 62/352,827, filed on Jun. 21, 2016, the entire content of which is incorporated herein by reference.

FIELD OF THE DISCLOSURE

Aspects of the disclosure relate to sensing devices for anchor bolts such as rock bolts. More particularly, aspects relate to sensing devices that sense loss of preload and/or overload of an anchor bolt.

BACKGROUND

Rock bolts are typically used for reinforcement of tunnels in rock formations, such as mines, traffic tunnels, dams, bridges, etc. Rock bolts may provide support for rock formations and may hold the formation together when cracks form. If a rock bolt fails, the structural integrity of a tunnel may be compromised and fatal accidents may follow. Typically, a rock bolt may be preloaded with a portion of the total load for which the rock bolt is rated. For example, a conventional rock bolt may be preloaded to 80% of its full load bearing rating.

Rock bolts may fail due to a number of reasons including, but not limited to: old age; corrosion; overload; slippage or displacement in the rock due to faulty anchorage or breakdown of filler material surrounding the bolt; a loose or lost nut; thread stripping; cracks or displacement of rocks (e.g. due to a blasting operation or earth quakes); faulty or incomplete installation; temperature variations, etc. If a rock bolt loses its grip in a hole, it may become loose and lose its preload. Such reductions of load below the preload threshold may result in the rock bolt not properly holding the rock formation together. Displacement may, for example, be common in the face of a drift (the front end where ore is being removed) when blasting of the rock face is performed and vibrations and cracks runs through the rock formation.

Another failure that can occur is overloading. If a rock formation cracks or shifts, possibly in response to a seismic event, a rock bolt may be overloaded. The term "overloaded" in this context means that the tension on the rock bolt may exceed a maximum tolerance of the rock bolt, or a predetermined tolerance or threshold that is less than the maximum tolerance of the rock bolt. Overloading may occur when anchorage in the rock formation is good, but scree or larger rocks crack away and are stopped by the rock bolts spreader washer or bearing plate (and possibly a mesh, if present). If the forces from the moving rock mass get too high the bolt will displace or become overloaded, and may break and fall down with the rock. Overload may also occur, for example, in rock bolts installed in a tower foundation if wind against the tower causes more load on one or more parts of the foundation Thus, it may be desirable for every rock bolt to be constantly monitored for faults or failures.

Single rock bolts may be used. However, a typical operation more commonly includes a large array of rock bolts. For example, hundreds or thousands of rock bolts may be used to support a tunnel (e.g. a traffic tunnel or a mine shaft). Such high numbers of rock bolts, combined with the fact that they are often installed in locations that are difficult to access, makes regular periodic inspections expensive and time consuming.

Conventional monitoring and inspection methods may require a custom-prepared rock bolt. A typical custom bolt may have an elongated hollow chamber within that extends substantially along the length of the bolt. An expensive and fragile sensor unit including wires etc. may be permanently installed within the chamber. The sensor unit by itself may cost much more than a standard rock bolt. These conventional instruments and sensors may only allow for periodic and sampling inspection on site, for example, by a person climbing up and connecting an inspection tool to the rock bolt.

A conventional rock bolt sensor may be intended only for research and not for mass installation and monitoring. Some rock bolt arrays are wired up for periodic or continuous inspection, but this may become very costly in conventional sensor monitoring systems. A conventional sensor system may require a rock bolt to be customized or modified in order to be used with the sensor. Such systems may be costly and subject to shorts and break-downs (e.g. due to heavy vehicles passing through the tunnel). Conventional sensors may be easily damaged by physical movements and/or water ingress. Conventional rock bolt sensors systems may include a rock bolt with a hole along its length and a strain gauge or a vibrating wire in the hole. Such sensors typically put no load on the rock bolts. The rock bolt may lose anchorage or be broken/corroded without triggering the sensor. Thus a critical failure may not be detected.

As an alternative to sensor wires being housed in a chamber within the rock bolt, a conventional rock bolt may have a wire wound around the outer periphery of the rock bolt or a secondary metal tube with a vibrating wire type sensor in it. Such wires may be exposed to grout or epoxy that surrounds the rock bolt. Installation of the rock bolt may include spinning the bolt to mix the grout or epoxy which may be messy. The grout or epoxy may also interfere with access to the sensor parts. Furthermore, if a conventional rock bolt includes a strain gauge, it must be inside the hole in the rock formation, which may be grouted. This may require long wires and connectors to a casing on the wall for signal collection and wireless transmission.

Conventional sensors may also be inaccessible once the rock bolt is installed in a hole in the formation, either due to the sensor being within a chamber in the rock bolt, or being within the hole and possibly covered with grout or epoxy.

SUMMARY

According to one aspect, there is provided, a sensing device for an anchor bolt, the sensing device comprising: a spacer having a first end and a second end opposite to the first end, the spacer defining a passage therethrough from the first end to the second end for passage of the anchor bolt; at least one load sensor, each said at least one load sensor comprising a respective resilient compressible element positioned at a respective one of the first and second ends of the spacer, each said resilient compressible element compressing responsive to a respective load threshold, and each said at least one load sensor providing respective sensor output as a function of whether or not the respective resilient compressible element is compressed; and output means for generating device output indicating a status of the anchor bolt as a function of the sensor output for each said at least one load sensor.

In some embodiments, for each said at least one load sensor, the load sensor further comprises a respective switch, each said switch comprising two or more electrically conductive contacts positioned such that compression of the resilient compressible element at the respective load threshold moves one of the two electrically conductive contacts to contact at least one other of the electrically conductive contacts, thereby closing the switch.

In some embodiments, the device further comprises an electronics housing, the housing extending at least partially around the periphery of the spacer.

In some embodiments, the housing is deflectable and comprises, for each at least one load sensor, a respective outer face that faces the resilient compressible element, and for each said at least one load sensor: a first of the two electrically conductive contacts of the respective switch is disposed within the housing adjacent to the outer wall and opposite to the corresponding outer face, and a second of the two electrically conductive contacts is disposed within the housing and spaced apart from the first electrically conductive contacts when the resilient compressible element is uncompressed; compression of the resilient compressible element at the respective load threshold causes the resilient compressible element to press against and deflect the outer wall inward such that the first electrically conductive contact engages the second electrically conductive contact.

In some embodiments, for each said load sensor, the first electrically conductive contact comprises an electrically conductive ring.

In some embodiments, the second electrically conductive contact comprises an electrically conductive arcuate spring.

In some embodiments, for each said load sensor, the resilient compressible element comprises a disc spring defining a hole therethrough for passage of the anchor bolt, the hole of the disc spring being aligned with the passage of the spacer.

In some embodiments, the at least one load sensor comprises at least one of: a preload sensor, wherein the load threshold for the preload sensor is a preload threshold; and an overload sensor, wherein the load threshold for the overload sensor is an overload threshold.

In some embodiments, the device comprises the preload sensor, wherein the device output indicates that preload is not maintained if the two electrically conductive contacts of the preload sensor are disengaged such that the switch of the preload sensor is open.

In some embodiments, the device comprises the overload sensor, wherein the device output indicates that the anchor bolt is overloaded if the two electrically conductive contacts of the overload sensor are engaged such that the switch of the preload sensor is closed.

In some embodiments, the overload threshold is higher than the preload threshold.

In some embodiments, when the sensing device is attached to the anchor bolt and the anchor bolt is installed in a formation, the sensing device is positioned between a head end of the anchor bolt and the formation.

In some embodiments, the device further comprises an electronics housing, the housing extending at least partially around the periphery of the spacer, wherein, for each said at least one load sensor, the respective electrical contact protrudes from electronics housing and is positioned such that the respective resilient compressible element engages the electrical contact when substantially compressed.

In some embodiments, the output means comprises a transmitter.

In some embodiments, the output means comprises a light and the device output comprises a visual indicator.

In some embodiments, the device further comprises a power source that powers the sensing device.

In some embodiments, the device further comprises a strain gauge for measuring load on the anchor bolt.

In some embodiments, the electronics housing is detachable and replaceable.

In some embodiments, while preload is maintained and the anchor bolt is not overloaded, the output means periodically transmits a signal indicating the status of the anchor bolt as the device output.

In some embodiments, each said at least one sensor is configured to: draw power in a respective alert condition; and not draw power in a non-alert condition.

In some embodiments, the at least one sensor comprises a preload sensor and the alert condition for the preload sensor is a loss of preload condition.

In some embodiments, the resilient compressible element of the preload sensor being uncompressed indicates the loss of preload condition.

In some embodiments, the at least one sensor comprises an overload sensor and the alert condition for the overload sensor is an overload condition.

In some embodiments, the resilient compressible element of the overload sensor being compressed indicates the overload condition.

In some embodiments, the device further comprises a sensor that senses at least one of vibrations and seismic activity.

In some embodiments, the anchor bolt comprises a rock bolt.

In some embodiments, each said load sensor comprises a respective proximity sensor positioned to trigger when the corresponding resilient compressible element of the load sensor is compressed.

According to another aspect, there is provided an anchor bolt comprising the sensing device as described above or below.

According to another aspect, there is provided a system comprising: a plurality of anchor bolts; for each of the plurality of anchor bolts, a respective sensing device as described above or below; and a central computer that receives the device output from each sensing device.

In some embodiments, the device further comprises a leaky feeder cable that provides wireless power to the sensing devices.

In some embodiments, the sensing devices each comprise a respective wireless transmitter and the leaky feeder cable receives signals wirelessly transmitted from the sensing devices.

In some embodiments, the leaky feeder cable carries the received signals for transmission to the central computer.

In some embodiments, the sensing devices each comprise a respective wireless transmitter and transmit wireless signals for receipt by the central computer.

Other aspects and features of the present disclosure will become apparent, to those ordinarily skilled in the art, upon review of the following description of the specific embodiments of the disclosure.

BRIEF DESCRIPTION OF THE DRAWINGS

Aspects of the disclosure will now be described in greater detail with reference to the accompanying diagrams, in which:

FIG. 4A is a side, partially cross-sectional view of the sensing device of FIG. 2 in normal operation;

FIG. 26A is a side partial cross-sectional view of a sensing device on the rock bolt with a wedge according to still another embodiment;

Figure 28:
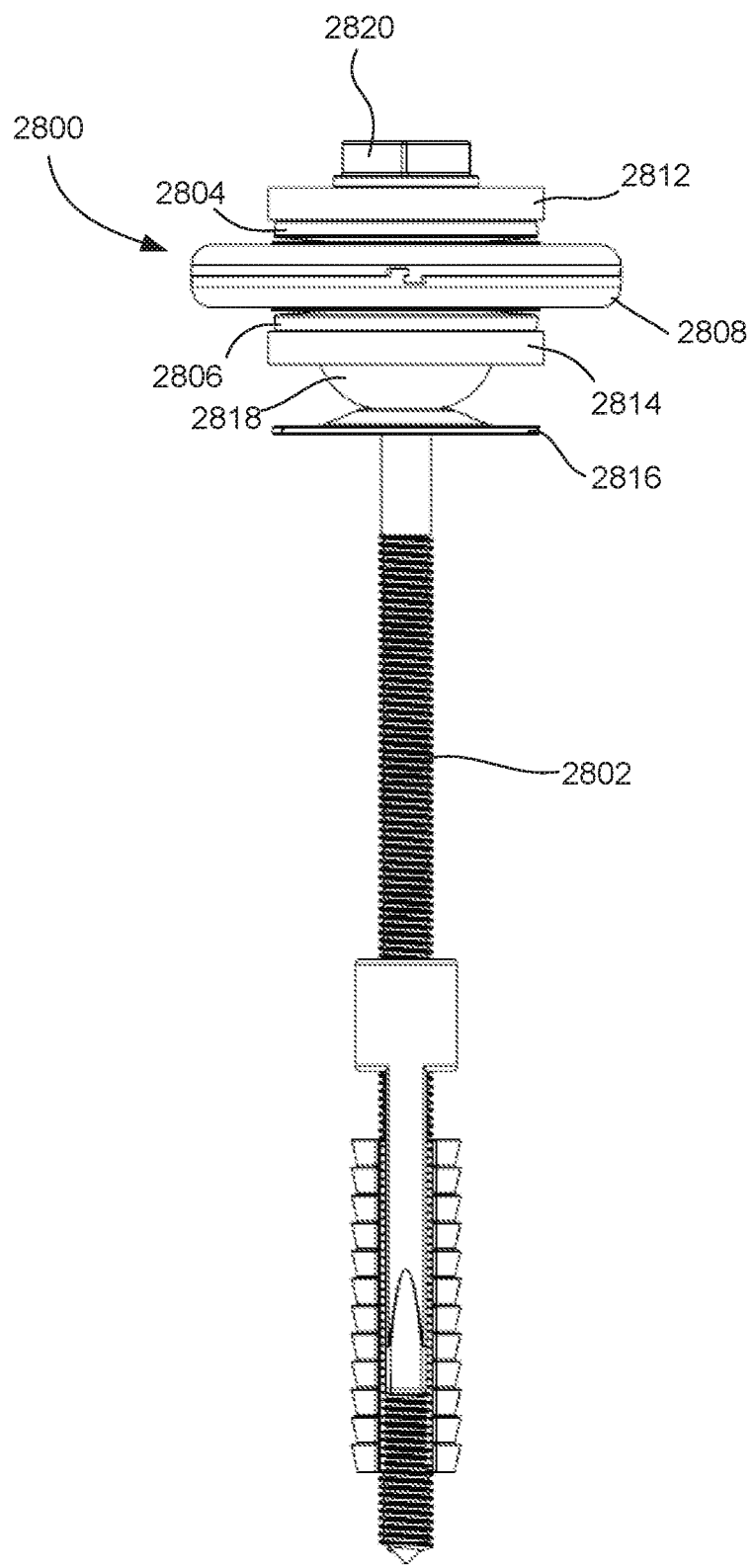
Figure 29:
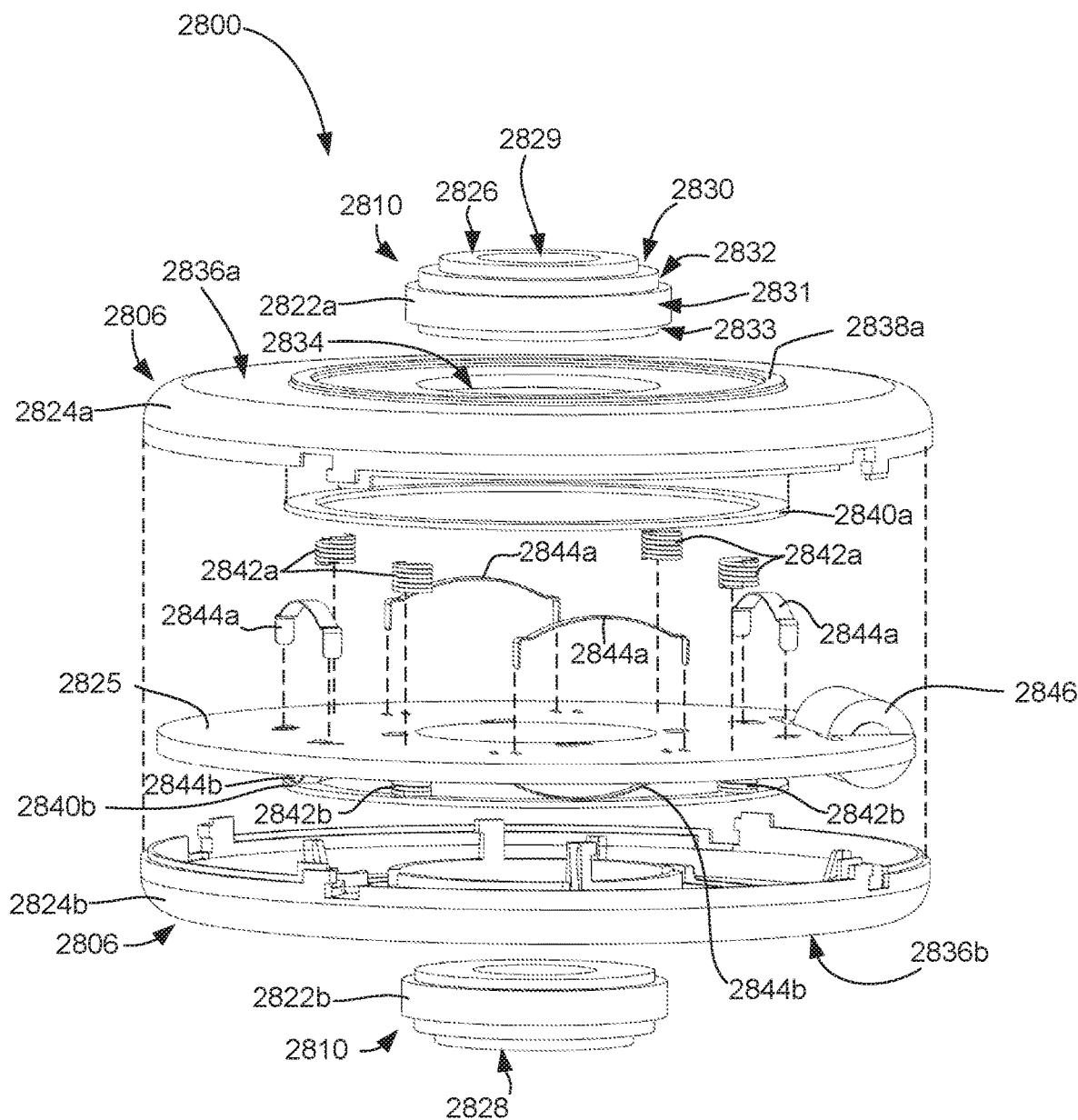
Figure 30:
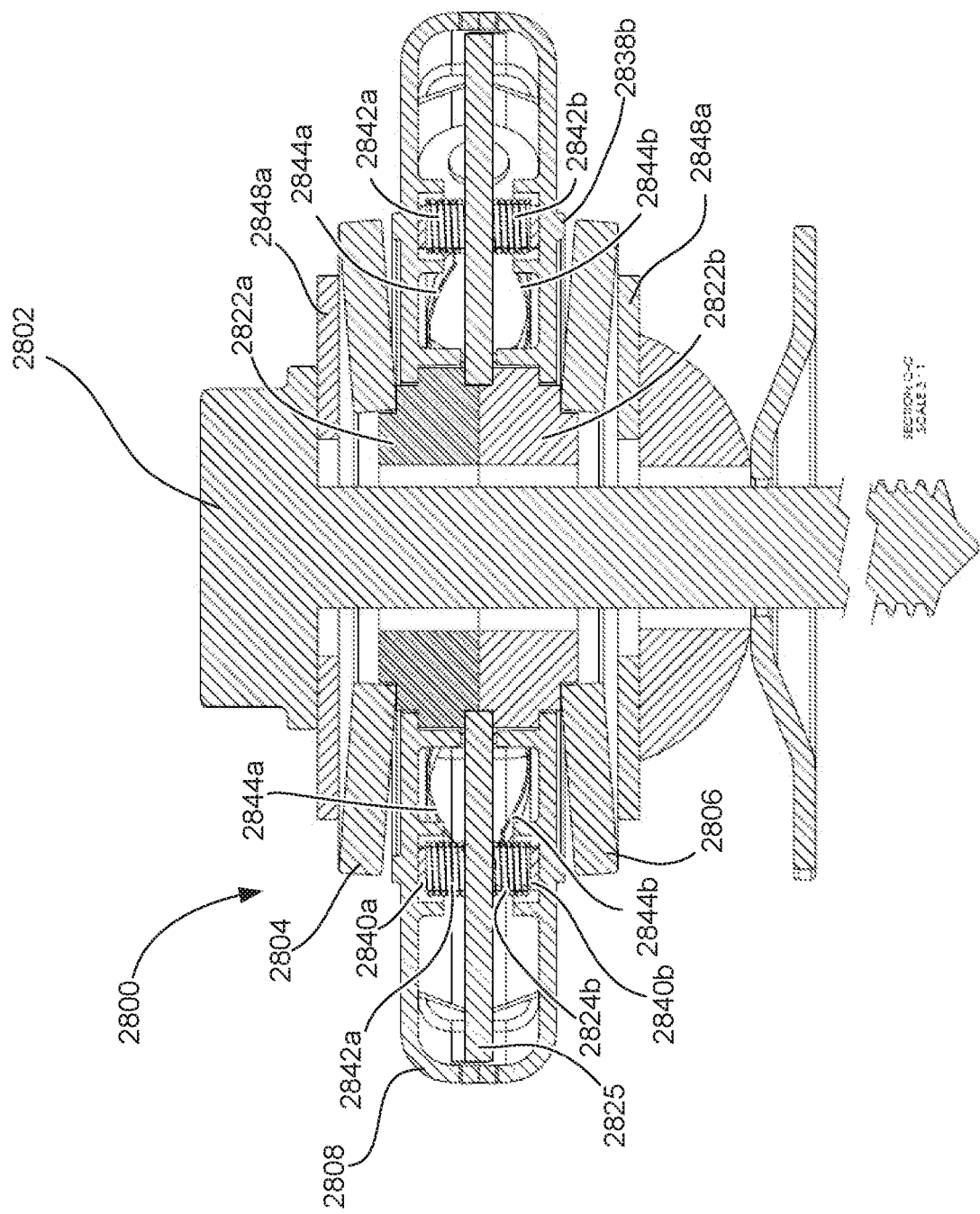
Figure 31:
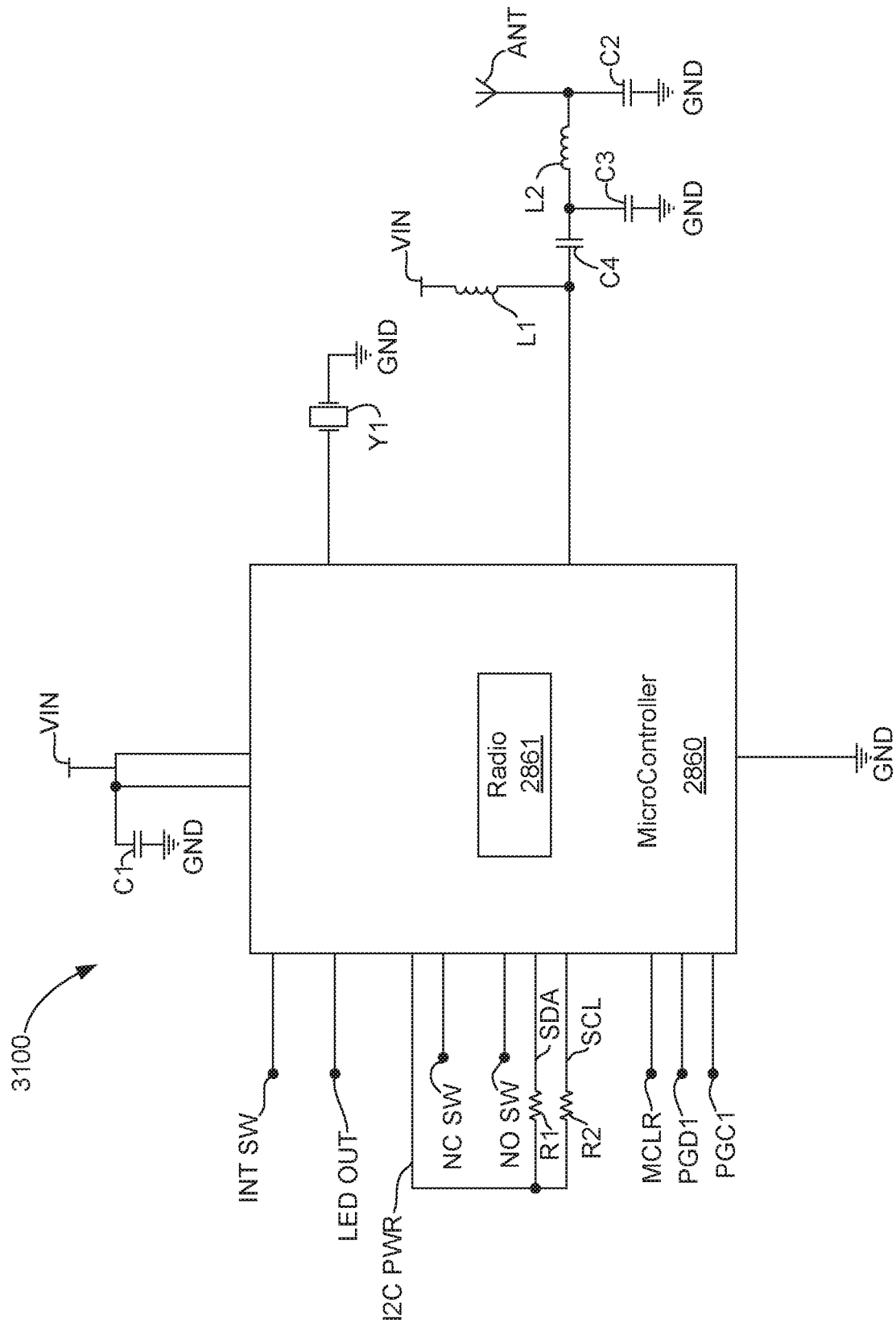
Figure 32:
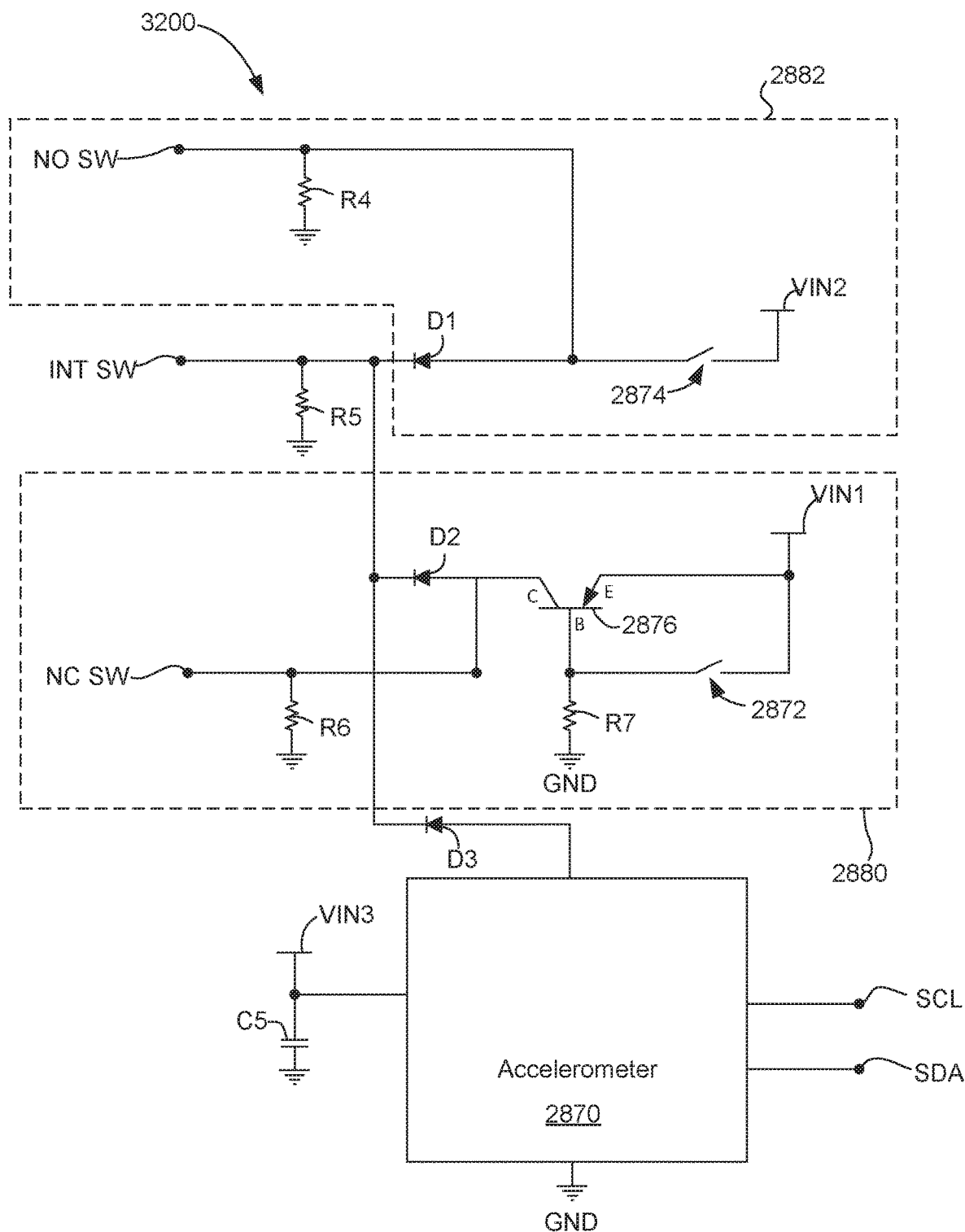
Figure 33:
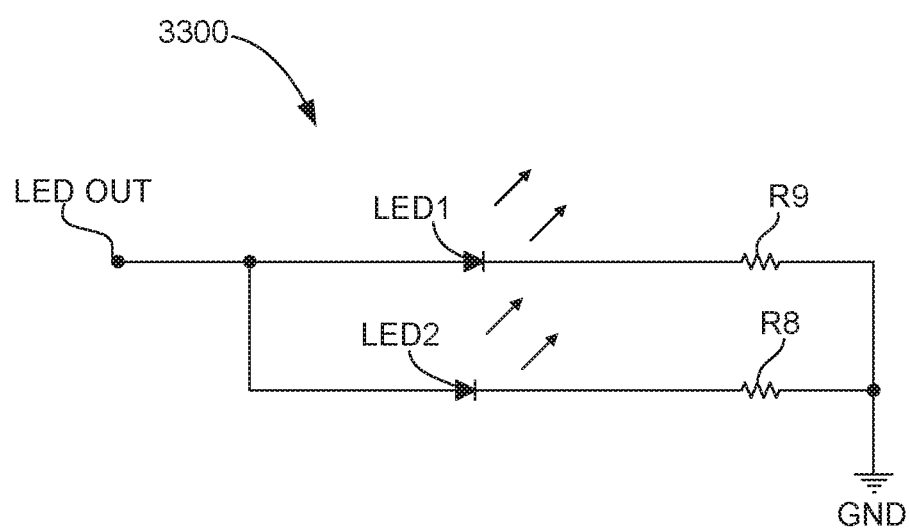

26B is a side partial cross-sectional view of a sensing device on the rock bolt according to still another embodiment;

FIG. 27A shows a side view of the wedge of FIG. 26A;

FIG. 27B shows a top view of the wedge of FIG. 26A;

FIG. 28 is a side view of a rock bolt sensing device, according to yet another embodiment, shown mounted on a rock bolt;

FIG. 29 is an exploded perspective view of the sensing device of FIG. 28;

FIG. 30 is a cross-sectional side view of the assembled sensing device of FIGS. 28 and 29 mounted on the rock bolt;

FIG. 31 shows example circuitry of the sensing device of FIGS. 28 to 30, including a microcontroller;

FIG. 32 shows example circuitry for generating a vibration interrupt switch input, a preload switch input, and an overload switch input to the microcontroller in FIG. 31; and FIG. 33 shows example LED circuitry of the sensing device of FIGS. 28 to 30.

DETAILED DESCRIPTION

Embodiments of a sensing device are described herein. Although described as used with rock bolts, it is to be understood that the sensing devices described herein are not limited to use with rock bolts and may also be used with other anchor bolts or other load bearing elements that are inserted into a base structure and secured in place.

Figure 1:
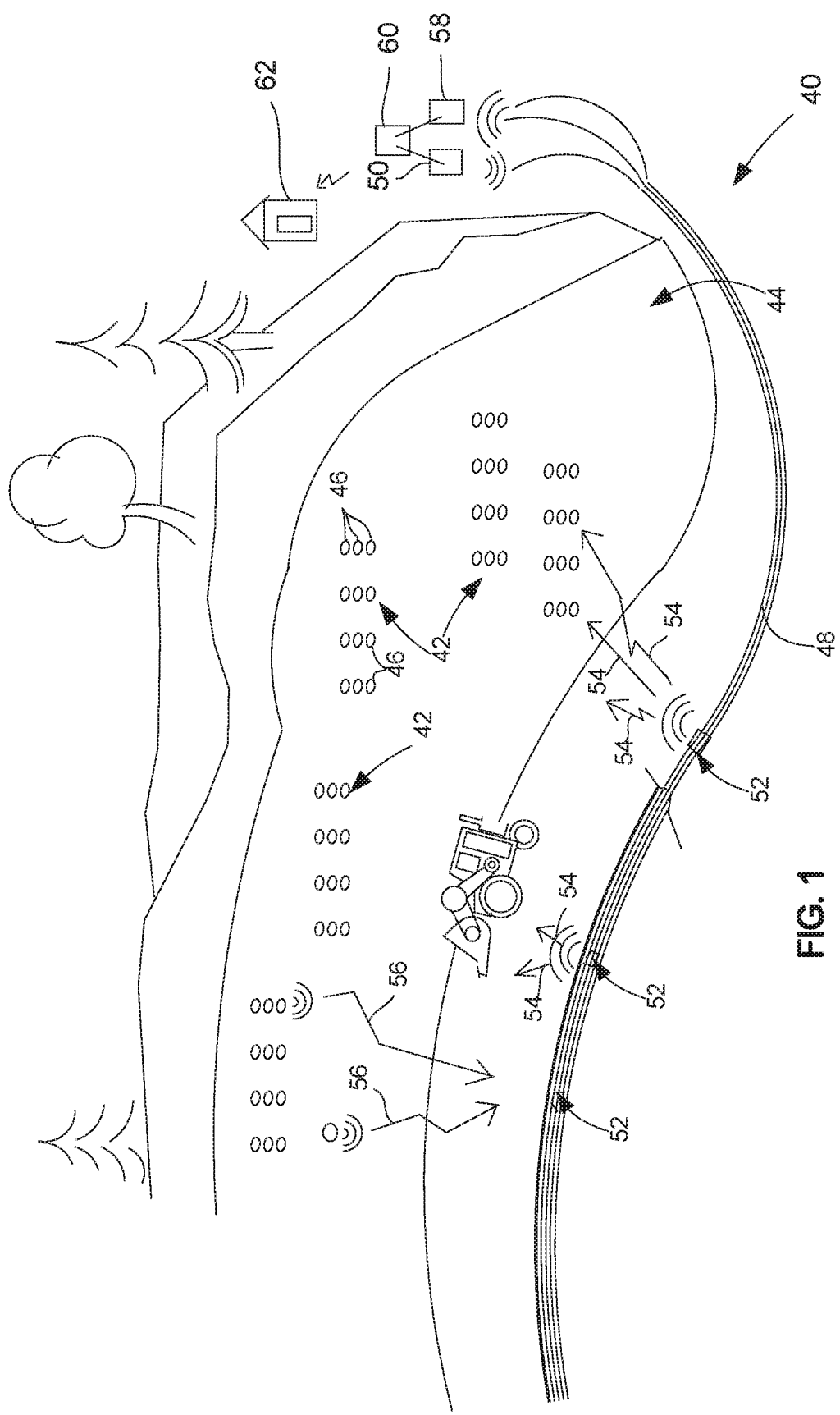
FIG. 1 is an illustration of a rock bolt system according to some embodiments.

FIG. 1 is an illustration of a rock bolt system 40 according to some embodiments. The system 40 includes a network of rock bolts 42 installed in a tunnel 44, such as a mine. The tunnel 44 is shown as a cross-section. The number and distribution of rock bolts 42 in FIG. 1 is provided for illustrative purposes only. In a typical operation, there may be thousands of rock bolts 42 in a network (e.g. 10 thousand or more). The rock bolts 42 are each installed with a sensing device 46 that may be similar to the sensing devices described below (such as the sensing device 100, 300, 400, 500, 700, 800, 900, 1000 or 1100 of FIG. 2, 9, 10, 11, 14, 17, 18, 22 or 24). The sensing devices 46 sense whether a preload tension is maintained in the rock bolts 42 and provide an alert if the preload tension is not maintained. The sensing devices 46 may also sense whether an overload tension is exceeded and provide an alert if the overload tension is exceeded. The sensing devices 46 may also provide output (possibly periodically) indicating normal operation (i.e. preload maintained). Such output may be in the form of a periodic "OK" status signal. The sensing devices 46 may also sense seismic activity or vibrations around the rock bolt.

The system 40 optionally includes a leaky feeder cable 48 that receives power from a power source or node 50. The leaky feeder cable 48 in this example is laid out alongside tunnel 44, emitting RF energy and acting as a linear antenna to receive and transmit signals to and from the sensing devices 46. The leaky feeder cable 48 may provide wireless power (as indicated by arrows 54), such as RF energy, to the tunnel at various points 52. For example, leaky feeder cables may have a sheath or jacket removed to expose the conductive core of the cable (not shown) at the "leak" points 52 to provide the wireless power radiation. The sensing devices 46 may be equipped with a wireless power harvester (not shown) to harvest the wireless power provided by the leaky feeder cable 48 to thereby power the sensing devices 46. Alternatively, the sensing devices 46 may include a battery or other power source (not shown). The leaky feeder cable 48 may also transmit and/or receive wireless transmissions to/from the sensing devices 46 as explained below. The leaky feeder cable 48 may be laid out in a loop in the tunnel 44. Embodiments are not limited to any particular length of the leaky feeder cable 48.

In some embodiments, the leaky feeder cable 48 may be capable of picking up wireless transmissions from sensing devices. For examples, wireless transmissions from up to 50 meters away may be picked up at the leak points 52 of the cable 48. The system 40 includes a central computer 62 and optional receiver device 58, access point 60 and the power source 50. Alerts and/or other output, such as "OK" status signals from the sensing devices 46 may be transmitted to the central computer 62. In the example of FIG. 1, wireless transmissions (indicated by arrows 56) are sent from the sensing devices 46 and are picked up by the leaky feeder cable 48 which then transmits the signals to receiver device 58. The receiver device 58 and the power source 50 are in communication with an access point 60 which is, in turn, in connection with central computer 62 (e.g. by an Ethernet cable or any other suitable means). A person skilled in the art will appreciate that other methods may be used to communicate signals to a central computer. For example, in other embodiments, sensing devices may be directly in communication with the central computer through wired and/or wireless connections.

Alternatively, a separate communication network (e.g. wireless local area network) may be used to transmit signals from the devices 46 to the central computer 62. In that case, the leaker feeder cable 48 may still be used to provide power to the sensing devices 46. The network may include one or more wireless radios (e.g. transceivers) and possibly relays enable transmission of wireless signals from the sensing devices 46 to the central computer 62. Any suitable method for communication of signals between the sensing devices 46 and a remote computer may be used in the embodiments described herein.

The central computer 62 analyzes the communications received from the sensing devices 46 and controls the power transmitted by the leaky feeder cable 48. The leaky feeder cable 48 may allow communication with rock bolts large distances from the central computer 62 and unhampered by corners and different levels of tunnels drifts. The central computer 62 may also control the power source 50 providing power to the leaky feeder cable 48.

The central computer 62 may monitor for periodic "OK" status signals from the rock bolts 42. In the event that no "OK" signal is received from one or more rock bolts 42 for a predetermined amount of time (indicating a possible malfunction), the central computer 62 may generate an alert output to a display and/or audio device, and/or the central computer 62 may generate an output (e.g. email or other transmission) to a remote computer via a communications network (e.g. Internet or wireless network). The alert may include an identification of the malfunctioning rock bolt(s) 42. The central computer 62 may have two way communication with the sensing devices 46. For example, the central computer 62 may generate and transmit interrogation signals to the sensing devices 46 to obtain status reports. The central computer 62 may display all received signals from the sensing devices 46 that were received within a predetermined period of time (e.g. one day, one week, etc.). The predetermined period of time may be set by a system operator. The central computer may store any received signals from the sensing devices 46 indefinitely, to be viewed when needed. The central computer 62 may send interrogation signal inquiring about the operational status of one or more of the sensing devices 46 at predetermined intervals (e.g. one day, one week, etc.). The predetermined period for sending interrogation signals may, again, be set by a system operator.

In other embodiments the functions of one or more of the power source 50, the receiver device 58, the access point 60 and the central computer 62 may be in the same location and/or be implemented in a single computer. Other embodiments may omit one or more of these components of the system 40. The status of the rock bolts 42 may be monitored at one or more remote locations (e.g. worldwide) using network communications. Safety protocols and actions, such as activating signs, traffic lights, closing booms, etc. may automatically be activated based on the output from the rock bolts 42. For example, the central computer 62 could communicate with one or more signs, traffic lights, emergency services etc. The status of the rock bolts may be monitored 24 hours a day, seven days a week. The central computer 62 may log alert reports based on the output of the sensing devices 46. For example, data concerning the output of the sensing devices 46, including alert information, may be stored in memory.

Any suitable wired and/or wireless method for transmitting signals (including WiFi, Internet of Things (IoT)) may be used to transmit alerts and other status signals from the sensing devices 46 and embodiments are not limited to the leaky feeder cable 48 arrangement shown in FIG. 1.

As will be explained in more detail below, the output from the sensing devices 46 may provide information on the status of the rock bolts 42 (e.g. alerts) as well as information, such as a code, indicating the identity or location of the particular rock bolts for which status is being reported. For example, a failure alert may indicate the type of failure (overload or loss of preload) as well as the identification of the rock bolt that has failed. Thus, even if the network includes a large number of rock bolts 42, the location of the failed rock bolt(s) may be relatively quickly ascertained. The sensing devices 46 may also receive interrogation signals from the central computer 62.

Various modifications to the system 40 shown in FIG. 1 are possible. For example, rock bolts 42 may instead transmit output via wired connections, or may transmit to a wireless receiver or relay rather than a leaky feeder cable. Other variations are described in more detail below.

As will also be explained below, in some embodiments, the sensing devices described herein include a spacer and compressible components that may withstand greater loads of tension than the rock bolt on which they are installed. Thus, the sensing devices may not compromise integrity of the rock bolts. Furthermore, the sensing devices may be relatively low cost and have a relatively long life to allow monitoring of large networks of rock bolts (e.g. 10 thousand or more). The sensing devices described herein may also be used, in some embodiments, to allow a preload tension to be applied to rock bolts types that may conventionally not have a preload (e.g. friction or inflatable bolts).

Figure 2:
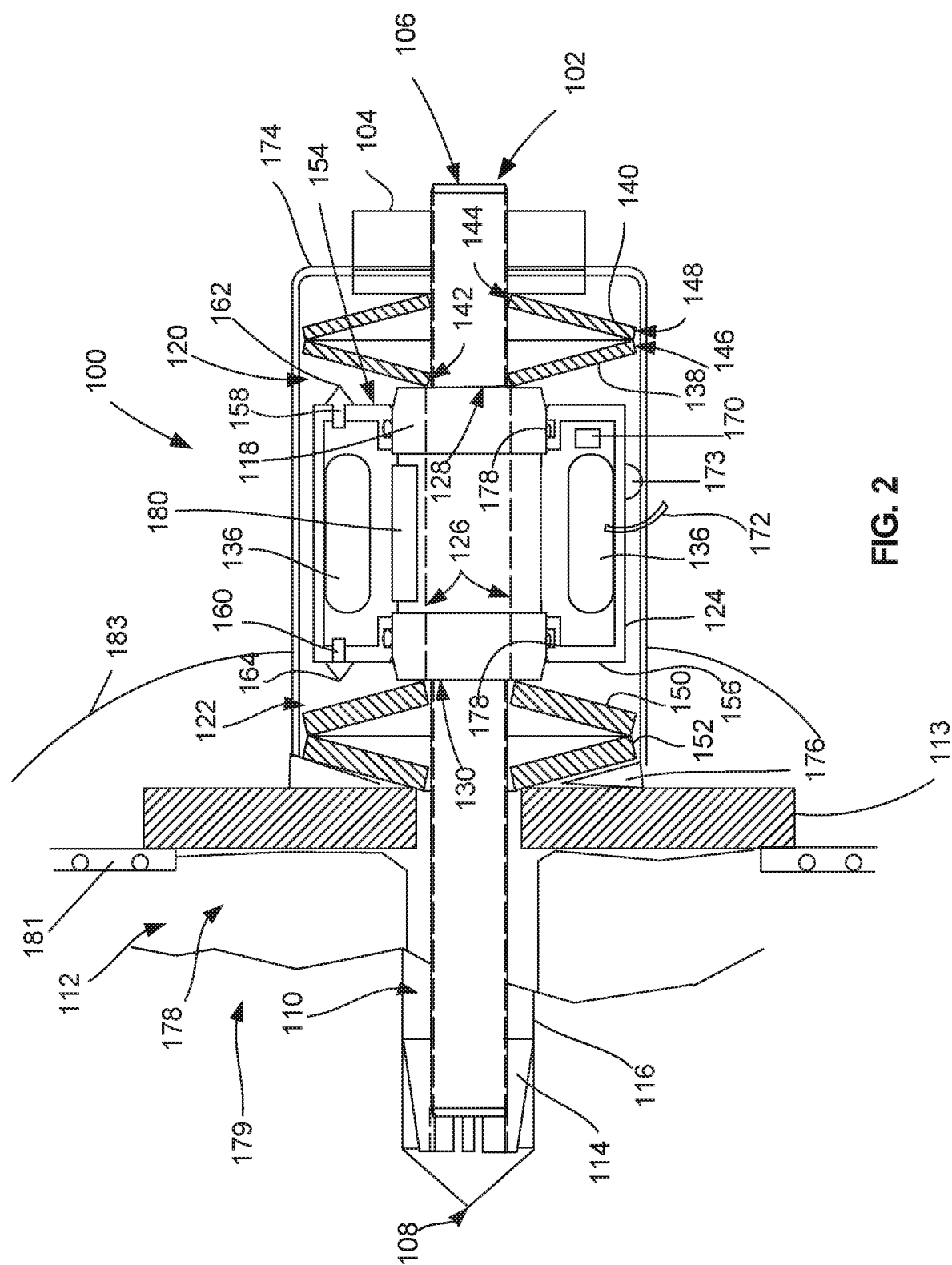
FIG. 2 is a side, partially cross-sectional view of a sensing device according to one embodiment attached to a rock bolt.

An example sensing device 100 for a rock bolt 102 according to one embodiment is shown in FIG. 2. FIG. 2 is a side, partially cross-sectional view of the sensing device 100 attached to the rock bolt 102 in a formation 112. The sensing device 100 is partially cross-sectioned in FIG. 2 to allow elements discussed below to be viewed. The rock bolt 102 in this example is an anchor bolt, although the sensing device 100 may be used with other types of rock bolts or load bearing elements, and embodiments are not limited to use with the rock bolt 102 shown in FIG. 2. The sensing device 100 may be used to sense and/or maintain a preload in the rock bolt and to sense overload of the rock bolt.

The rock bolt 102 in this example is threaded and includes a nut 104 threaded onto a head end 106 of the bolt. Opposite to the head end 106 is the insertion end 108 which is inserted into a hole 110 of a rock formation 112. The space between the rock bolt 102 and the surface of the hole 110 may be filled by injected grout, epoxy or special fast setting concrete to improve the anchorage in the rock formation 112.

In this example, a bearing plate or spreader washer 113 is placed between the head end 108 of the bolt 102 and the rock formation 112, although bearing plates may not always be used. The insertion end 108 includes an expandable anchor 114 for gripping the inner surface 116 of the hole 110. When installed, as shown in FIG. 2, the insertion end 108 and a majority of the rock bolt 102 is inserted in the hole 110 and anchored in position by the anchor 114. The rock bolt 102 partially protrudes from the hole 110. The nut 104 may be used to apply sufficient preload tension to the rock bolt.

The sensing device 100 in this example includes a spacer 118, a preload sensor 120 and an overload sensor 122, and an electronics housing 124.

The spacer 118 defines a passage 126 therethrough for passage of the rock bolt 102. When the rock bolt 102 is installed in the formation 112, the spacer 118 of the sensing device 100 is positioned on the rock bolt 102 between the head end 106 of the rock bolt 102 and the formation 112. Rock bolts vary in diameter, and the spacer size may be chosen based on the particular rock bolt 102 used with the device 100. The spacer 118 has an internal diameter to fit loosely, but securely, on the rock bolt 102. For example, if the rock bolt 102 in this example has an outer diameter of approximately 19 mm (approximately ¾ inch), then the inner diameter of the spacer 118 may be 20 mm. Spacers may be used with rock bolts having outer diameters in the range of ½ inch to ¾ inch, for example. However, embodiments are not limited to this range. The passage 126 of the spacer 118 is shown in stippled lines in the side view of FIG. 2 to indicate that would normally be hidden from view.

The spacer 118 in this embodiment is rigid and generally tubular shaped although other shapes are possible, including but not limited to rectangular prism. The spacer 118 may be made of any material and in any size and shape suitable to withstand loads higher than an overload threshold for the rock bolt 102. The spacer 118 may transfer the tensile force in the rock bolt 102 to pressure on the preload sensor 120 and the overload sensor 122 of the sensing device 100. The spacer 118 provides space outside of the rock formation 112 for placement of the sensing device 100.

The spacer 118 has a first spacer end 128 and an opposite second spacer end 130. The first spacer end 128 faces the head end 106 of the rock bolt 102 and the second spacer end 130 faces the bearing plate 113 and the rock formation 112.

The spacer 118 may be long compared to its inner diameter, and the play between the inner diameter of the spacer 118 and the rock bolt 102 may be small. The elongated form of the spacer 118 may have the result that some misalignment of the rock bolt 102 (away from perpendicular with respect to the rock face) will still result in forces being substantially perpendicular to the length of the spacer 118.

Where rock bolts are at a non-perpendicular angle to the face of the rock formation, wedges or other alignment device may be used to provide a bearing surface that is more perpendicular to the length of the rock bolt and the sensing device (such as rock bolt 102 and sensing device 100 in FIG. 2). Conventional wedge devices or other suitable means may be used for this purpose. For example, some spreader plates may include alignment features such as a dome shape that provides a range of generally angles at which the rock bolt 102 and sensing device 100 may have still be substantially perpendicular to the surface of the bearing plate (see FIG. 26B, for example).

The preload sensor 120 is arranged near the first spacer end 128 and the overload sensor 122 is arranged near the second spacer end 130. In other embodiments, the placement of the preload sensor 120 and overload sensor 122 may be reversed. The preload sensor 120 includes first and second disc springs 138 and 140 (which together function as a resilient compressible element of the preload sensor 120). The overload sensor includes third and fourth disc springs 150 and 152 (which together function as a resilient compressible element of the overload sensor 122). The disc springs 138, 140, 150 and 152 function as mechanical actuators that store energy. For example, some disc springs may store approximately 400-500 kWs. The first and second disc springs 138 and 140 compress responsive to a preload threshold, and the third and fourth disc springs 150 and 152 compress responsive to an overload threshold. The preload sensor 120 also includes a first electrical contact 158, and the overload threshold includes a second electrical contact 160, which are discussed below.

The preload sensor 120 and the overload sensor 122 are arranged in parallel with the spacer 118. The preload sensor 120 provides a preload sensor output as a function of a compression state of the first and second disc springs 138 and 140. The overload sensor 122 provides an overload sensor output as a function of a compression state (e.g. compressed or not compressed) of the third and fourth disc springs 150 and 152. The compression state and output of the sensors will be discussed below in more detail.

The electronics housing 124 is generally ring-shaped in this embodiment, although other shapes are also possible. The electronics housing 124 is arranged around the outer periphery of the spacer 118. The electronic housing has a first face 154 and an opposite second face 156. The electronic housing may be in other shapes in other embodiments. Some embodiments may not include an electronics housing as shown in FIG. 2. The electronics housing 124 is made of a non-conducting (e.g. plastic) material in this embodiment.

The sensing device 100 further includes an electronics module 136 within the housing 124 that provides a device output indicating a status of the rock bolt 102 as a function of the preload sensor 120 output state and the overload sensor 122 output state. The electronics module 136 processes sensor output and includes output means for generating device output, as discussed below with reference to FIG. 3. In some embodiments, the electronics housing 124 and electronics module 136 may be omitted. For example, in an alternative embodiment (not shown) a simple output means (such as a light and/or speaker) may be attached directly to the spacer and connected to the sensors in order to provide output for the device.

The first and second disc springs 138 and 140 are cupped, define respective central holes 142 and 144 therethough to fit over the rock bolt 102. The first and second disc springs 138 and 140 have respective outer edges 146 and 148. Such disc springs 138 and 140 may be referred to as coned-disc springs, Belleville springs, or Belleville washers. The disc springs 138 and 140 may compress approximately 1.5 mm between the flat and uncompressed states, although other distances are possible. For example, the displacement from compression required to trigger the sensing device 100 may be approximately 0.5 mm in some embodiments. The disc springs 138 and 140 may have an outer diameter of a few inches (e.g. three inches). However, the size, thickness and shape of disc springs or washers may vary. The first and second disc springs 138 and 140 may be made of spring steel, for example, although embodiments are not limited to any particular material. Embodiments are also not limited to disc springs for the resilient compressible element(s) and other actuators that are displaceable may be used rather than disc springs in other embodiments. Any material and/or compressible structure with known properties in respect of displacement-to-load ratio and having a displaceable surface to trigger a sensor output may be used. Embodiments described herein are also not limited to conical-disc springs as the compressible element. Other spring types or other resilient compressible elements may also be used.

In this example, the first and second disc springs 138 and 140 are aligned axially with the spacer 118, adjacent to each other, and arranged in an alternating orientation such that the outer edges 146 and 148 are abutting, the central hole 142 of the first disc 138 abuts the spacer 118, and the central hole 144 of the second disc 140 abuts the nut 104 of the rock bolt 102. In other embodiments, disc springs/washers may be arranged with the same orientation. The first and second disc springs 138 and 140 may compress to a flattened state at 7 or 8 tons of load, for example, although other strengths of discs may also be used depending on the desired preload threshold. In the mirrored orientation of the first and second disc springs 138 and 140, the total load required to make contact with the electrical contact 158 may depend on the load capacity of the first disc spring 138. For example, if the first disc spring has a lower load capacity than the second disc spring 140, then the sensor may trigger at the load capacity of the first disc spring 138 (because it will engage the electrical contact 158). For sensing devices of other embodiments, two or more disc springs may have the same orientation (rather than mirrored), in which case the total force to flatten the disc springs will be the combined individual load capacities. In other embodiments, resilient compressible elements for load sensors may be formed by only one disc/washer or by more than two. Embodiments are not limited to any particular number orientation or strength of multiple adjacent discs/washers The preload threshold may be 80% of the yield load for the rock bolt 102. In some embodiments, such a coal mine, the preload threshold may be less. The preload threshold may be calibrated by the choice of compressible element (e.g. strength of the disc spring(s) used).

If the load on the rock bolt 102 is subsequently lowered below the preload threshold, the first and second disc springs 138 and 140 will resiliently spring back to the uncompressed, cupped shape. Due to the shape of the adjacent parts of the sensing device 100, the first and second disc springs 138 and 140 do not bend beyond flat. Disc springs/washers (suitable for use as first and second disc springs 138 and 140) may be color marked to show the tonnage that will cause them to be compressed to the flattened state. In one example, a first disc will be each compress to become flat at 5 tons load, and a second disc will be flat at 4 tons (yellow) load. If those disc springs are arranged with the same orientation (i.e. not mirrored), then 9 tons total will be required to flatten the pair of discs together.

The third and fourth disc springs 150 and 152 of the overload sensor 122 are arranged in a similar manner as the first and second disc springs 138 and 140 of the preload sensor 120, but positioned at the second spacer end 130. The third and fourth disc springs 150 and 152 fit between the spacer 118 and the bearing plate 113. The third and fourth disc springs 150 and 152 are chosen to compress to a substantially flat position in the when subjected to a desired threshold overload tension. The overload threshold is higher than the preload threshold. In this example, the third and fourth disc springs 150 and 152 may compress to a flattened state at 10 tons of load in this embodiment, although other strengths of discs may also be used. Embodiments are not limited to any particular orientation or strength of multiple adjacent disc springs. The third and fourth disc springs 150 and 152 of the overload sensor 122 may be thicker and/or made of a different material than the first and second disc springs 138 and 140 of the preload sensor 122 to provide the desired overload threshold. Different arrangements, orientations, number of discs and/or material may also be chosen to provide the different preload and overload thresholds.

As shown in FIG. 2, the preload sensor 120 includes a first electrical contact 158 and the overload sensor 122 includes a second electrical contact 160. The first electrical contact 158 is secured in the electronics housing 124 and partially protrudes from the first face 154 of the electronics housing 124. The second electrical contact 160 is secured in the electronics housing 124 and partially protrudes from the second face 156 of the electronics housing 124. The first electrical contact 158 has an outer end 162 that is substantially coplanar or aligned with the first spacer end 128. The second electrical contact 160 has an outer end 164 that is substantially coplanar or aligned with the second spacer end 130. When compressed (i.e. preloaded), the first disc spring 138 engages the first electrical contact 158. The first electrical contact 158 and the first and second disc springs 138 and 140 together function as a sensor switch that controls the output of the preload sensor 120 (as explained below). Similarly, when compressed, the third disc spring 150 engages the second electrical contact 160. Thus, the second electrical contact 160 and the third and fourth disc springs 150 and 152 together function as a sensor switch that controls the output of the overload sensor 122.

The preload sensor 120 and the overload sensor 122 in this embodiment may reduce false alarms compared to conventional sensors because the disc springs 138, 140, 150 and 152 may have a controlled travel distance (e.g. millimeters) during compression.

FIG. 2 also shows an optional net or mesh 181 on the rock formation 112 and an optional concrete layer 183 that may be sprayed on to cover the net 181 and partially covering the rock bolt 102.

Figure 3:
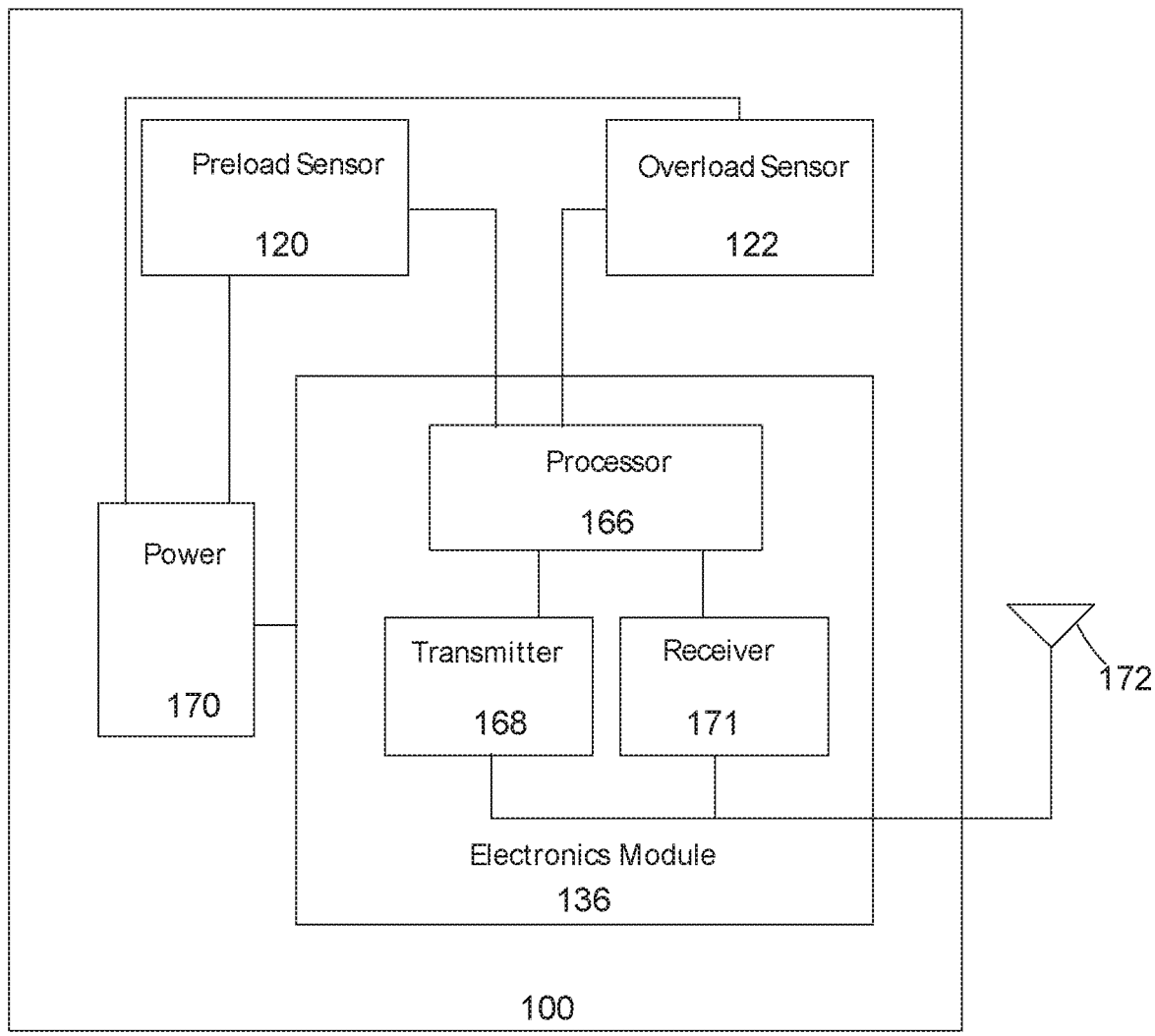
FIG. 3 is a block diagram of the electronics of the sensing device of FIG. 2.

FIG. 3 is a functional block diagram of the device 100 shown in FIG. 2 showing additional details of the electronics module 136. The electronics module 136 includes a processor 166, memory 167 and a transmitter 168. The sensing device 100 also includes a power source 170 and an antenna 172 (also shown in FIG. 2), along with the preload sensor 120 and the overload sensor 122. The memory 167 is connected to the processor 166 and may store instructions for controlling the processor to perform functions described herein. In some embodiments, the memory 167 may be integrated with the processor 166 and no external memory chip is included.

The processor 166 of the electronics module 136 receives, as input, output from the preload sensor 120 and the overload sensor 122. The processor 166 evaluates that input and controls the transmitter 168 to generate output for the sensing device 100 as a function of the preload sensor output and the overload sensor output. The sensing device 100 also includes an LED 173 as a second output means for providing visual output from the electronics module 136 as explained below. The LED 173 may be an ultra-bright LED and/or visible at wide angles. However, embodiments are not limited to any particular type of output. The transmitter 168 and antenna 172 are configured for wireless communication with one or more other electronic devices, such as a central computer. However, wired communication may also be implemented. The sensing device 100 in this example also includes a receiver 171 to enable two-way communication. Other embodiments may omit the receiver 171, which may simplify and possibly reduce the cost of the sensing device. The output from the sensing device 100 may be transmitted wirelessly in any suitable form, including but not limited to telegrams (e.g. Leaky Feeder System Protocol telegrams), Wi-Fi, cellular, etc. As explained in more detail below, the electronics module 136 is configured to generate output indicating the status of the rock bolt 102 based on the state of the preload sensor 120 and overload sensor 122. The output may include a wireless signal transmitted by antenna 172 and/or a visual indication, such as a light (e.g. LED) that turns on or flashes.

The power source 170 may be a battery. One example battery is a Tadiran™ TL-2450/P battery, which may provide over 25 years of life. Optionally, external power may be utilized rather than a battery. For example, in some embodiments, external power may be provided by a wired connection, or power may be provided by a Radio Frequency (RF) energy, sound or light energy harvester, which may provide an indefinite life span. A combination of battery and external power may also be implemented. The sensing device 100 may require only micro Watts to operate. For example, the processor 166 may be a Texas Instruments™ mixed signal microprocessor controller 2442KN1G3K250, which may consume only 0.5 µA in standby mode and 0.1 µA in OFF mode with RAM Retention.

In other embodiments, the sensing device may omit a battery and/or may receive external power. The external power may be received by wired or wireless power harvesting, leaky feeder energy radiation, a mechanically actuated electro dynamic generator, geothermal harvesting, etc.

Components in the electronics module 136, such as the processor 166, the transmitter 168 and the receiver 171, may be integrated on a Printed Circuit Board (PCB) within the electronics housing 124 shown in FIG. 2. The PCB may be flat or may be round to conform to the shape of the electronics housing 124. The electronics housing may be various sizes. In some embodiment, the electronics housing 124 may be approximately 2.5 to 3 inches in diameter, although embodiments are not limited to this range.

Turning again to FIG. 2, The first and second electrical contacts 158 and 160 area each connected to the processor 166 (shown in FIG. 2). The first, second, third and fourth disc springs 138, 140, 150 and 152 and the spacer 118 are metal and are connected with the electronic ground, which is 0VDC or "Logic Low". When the first and second electrical contacts 158 and 160 are not touching the corresponding first and third disc springs 138 and 150, the first and second electrical contacts 158 and 160 are registered by the processor 166 as "Logic High" (which is anything other than the 0VDC ground). When the first and/or second electrical contacts 158 and 160 touch the corresponding first and third disc springs 138 and 150, they are registered by the processor 166 as "Logic Low", or 0 VDC. The processor 166 can thereby distinguish when the first and/or second electrical contacts 158 and 160 are engaged. Thus, the voltage of first and second electrical contacts 158 and 160 functions as sensor output for the preload sensor 120 and the overload sensor 122 respectively. No or little current may flow through the first and second electrical contacts 158 and 160. The spacer 118 is connected with the electrical ground in the electronics module 136 by way of a connection through the electronics housing 124. This connection may include a wire or rivet in through the electronics housing 124 that contacts the spacer 118 for example. The first, second, third and fourth disc springs 138, 140, 150 and 152 may then be connected to ground by their direct or indirect electrical contact with the spacer 118.

The sensing device 100 further includes a protective cover 174 (such as a dust and/or water cap) around the sensing device 100 and a foam ring 176 at the base of the sensing device 100 to protect the sensing device 100 from water, dust, etc. One or both of the dust cover 174 and foam ring 176 may be omitted or replaced with other protective elements in other embodiments. The protection offered by the electronics housing 136, the protective cap 174 and the foam ring 176 may allow the sensing device 100 to be submersed under water without damage. The protective cover 174 may be semi-elastic or otherwise deformable to allow compression in the sensing device 100. The protective cover 174 may also be translucent or transparent to allow a visual indicator (e.g. Light Emitting Diode 173) to be seen through the protective cover 174.

The rock formation 112 may include a rock face and a scree 179 or breakaway rock hanging from the base of the rock formation 112, as shown in FIG. 2.

Turning again to FIG. 2, the electronics housing 124 may also include gaskets or O-rings 178 that fit around the spacer 118. The electronics housing 124 may be a plastic casing fitted with the O-rings 178. In FIG. 2, two O-rings 178 positioned near the first and second ends 128 and 130 of the spacer are shown, although the number and arrangement of such O-rings may vary. The electronic housing 124 together with the O-rings 178 may seal out water.

FIG. 2 also shows an optional strain gauge 180 affixed to the spacer 118. The strain gauge 180 may be protected from water by the O-rings 178 and the electronics housing 124. The strain gauge 180 may take analog readings of load on the spacer 118. The strain gauge 180 may be connected to, or integrated with a microprocessor, such as the processor 166 of the electronics module 136. The strain gauge 180 may be recessed into the spacer 118. The analog readings may be transmitted and/or used to generate output for transmission. For example, the output may be transmitted to a central computer system (not shown). The strain gauge 180 may only be activated to take readings in the event an alarm is triggered by the preload sensor 120 of the overload sensor 122, which may minimize power usage while still allowing analog strain measurements when needed. The strain gauge 180 may be generally in the form of a strip attached to the spacer 118 and connected to provide input to the processor 166 (shown in FIG. 3).

The sensing device may also include an accelerometer (not shown) for sensing seismic movement including vibrations. The processor 166 (shown in FIG. 3) may receive input from the accelerometer to generate output accordingly.

Installation and operation of the example sensing device 100 will now be described with reference again to FIG. 2. Before installing the rock bolt 102, the hole 110 is drilled in the rock formation 112. The sensing device 100 may be placed over the insertion end 108 of the rock bolt 102 (by sliding the rock bolt 102 through the passage 126 of the spacer 118 and through the first, second, third and fourth disc springs 138, 140, 150 and 152. The rock bolt 102 may then be inserted (by the insertion end 108), into the hole 110 in the rock formation 112. The anchor 114 may be expanded to grip the inner surface 116 of the hole 110 using any conventional means. Before applying any preload tension to the rock bolt 102, the first, and third disc springs 138, 140, 150 and 152 are all in a non-compressed state and the first and second electrical contacts 158 and 160 are not engaged by the first and third disc springs 138 and 150 (thus both sensor switches are open).

Next, the nut 104 may be used to apply at least a threshold preload tension to the rock bolt 102. At the threshold preload tension, the first and second disc springs 138 and 140 flatten and the first disc spring 138 engages the first electrical contact 158, thereby closing that switch and providing a preload sensor output state accordingly. The electronics module 136, produces an output as a function of the output state of the preload sensor 120 and the overload sensor 122.

In some rock bolt installations, bearing plates or spreader washers may be used to secure a mesh to the surface of the rock formation (e.g. tunnel surface). Fiberglass may be sprayed over the mesh. In such situations, the sensing device 100 may be covered (e.g. using a bag or cap) during the spraying process.

The preload and overload sensors 120 and 122 are essentially pre-calibrated by the choice of resilient compressible elements (i.e. disc springs 138, 140, 150 and 152) that compress at predetermined load thresholds. The preload and overload sensors 120 and 122 each have binary output states (e.g. on/off or high/low) depending on whether the respective electrical contacts 158 and 160 are engaged by the corresponding first and third disc springs 138 and 150. The combination of these binary output states is interpreted by the processor 166 of the electronics module 136 to generate the proper device output indicating the status of the rock bolt 102.

Table 1 below illustrates possible output signal bits that may be generated based on the output states of the preload sensor 120 and the overload sensor 122. In Table 1, "ON" means that the electrical contact 158 or 160 is engaged with the corresponding first or third disc spring 138 or 150, while "OFF" means that there is no engagement.

TABLE 1

| Preload Sensor Output State | Overload Sensor Output State | Status of Rockbolt |
| --- | --- | --- |
| OFF | OFF | Preload not maintained |
| OFF | ON | N/A or sensor malfunction |
| ON | OFF | OK (normal operation) |
| ON | ON | Overload |

The output may also include a unique rock bolt ID code to pinpoint which rock bolt is experiencing an alert condition. The output may also include a visual indicator, such as flashing LED 173. Output may also be encrypted in some embodiments.

The output may be transmitted (via transmitter 168) to a central computer (not shown). The central computer may receive input from multiple (e.g. hundreds or thousands) of different rock bolts. The central computer may also control a central alarm or alert notification such as, but not limited to display-alarm-control booms, traffic lights, broad casts (telephone notifications), etc. The central computer may also store information date stamp the alert event. There is virtually no limit in distance between the rock bolt site and the central computer by using the appropriate wireless and/or wired connections.

The output signal may also consist of a number of data fields. For example, a first field may be used for the rock bolt ID. The rock bolt ID may indicate a number of the sensing device or rock bolt (e.g. from 1 to 9999). As second data field could be indicate the status of the device. The status may be indicated using various status codes, which may optionally be time stamped. For example, the following status codes may be utilized by the sensing device 100:

Code 0: No fault, everything is working OK.

Code 1: Alarm—loss of pre-load, possibly indicating the failure of rock bolt anchor. May be sent immediately after such a condition is detected, and optionally repeatedly sent at predetermined or customizable intervals.

Code 2: Alarm—overload condition, possibly indicating that a large mass of rock is broken lose and it is exerting a force beyond the limits of the rock bolt. May be sent immediately after such a condition is detected, and optionally repeatedly sent at predetermined or customizable intervals.

Code 3: Alarm—overload condition followed by loss of pre-load, possibly indicating catastrophic failure and/or that the rock bolt is broken because too much force was applied to the bolt. May be sent immediately after such a condition is detected, and optionally repeatedly sent at predetermined or customizable intervals.

Code 4: Pending alarm—battery status low. May be used in embodiments equipped with battery as a power source.

Codes 5, 6, 7, 8 and 9 may be reserved for optional configuration, such as rock bolt length measuring, or tension measured by the strain gauge 180.

In order to avoid false alarms generated due to intermittent events such a rock blasting or similar mechanical disturbances near the location of the rock bolt 102, the sensing device 100 may transmit alarm signals only after detecting that the fault or alert condition lasts continuously for a predetermined time (e.g. 10 seconds). The predetermined time may be set by a user. Optionally, a motion sensor (not shown) such as an accelerometer or similar device can be employed, detecting mechanical disturbances as described above, and reporting them as a fault code.

The sensing device 100 may be configured to transmit its alert/fault and status codes through a variety of existing wireless networks. For example, the transmitter 168 and antenna 172 may be configured for transmission via a "Leaky Feeder Cable" system in mines and tunnels. Alternatively, LinkLabs LoRaWAN™ or a similar multi-band radio transceiver may be used as transmitter 168, and may use as little as 1 µA sleep current.

The sensing device 100 may optionally be configured to provide other alerts indicating: increase of bolt length beyond a safe point; bolt break detected by ultrasonic signal sent into the bolt; the tension of the rock bolt measured by a strain gauge. When the preload is maintained and no faults are detected, the sensing device 100 may also provide an output (such as a periodic signal) indicating that the rock bolt 102 is normal or OK.

Visual output (e.g. using LED 173) may also be provided. The processor 166 may be configured to activate the LED 173 in different modes responsive to various situations. For example, before the proper preload is applied during installation, then the sensing device 100 may flash the LED 173. When proper preload is applied, the LED 173 may be deactivated or may light up for a predetermined amount of time (e.g. 10 seconds). The LED may also turn on and/or flash when a fault is detected. The number of flashes may correspond with the particular fault code. One example of such correspondence is as follows: 1 flash every 20 seconds for fault code 1; 2 flashes for fault code 2; 3 flashes for fault code 3; 4 flashes for fault code 4, etc. The fault codes may indicate loss of preload, overload or other alert statuses discussed above. Optionally, the sensing device may include a sensor (not shown) for sensing input from a Coded Frequency Light Emitter, and the processor 166 may be configured to activate the LED 173 to light up for a predetermined time (e.g. 5 seconds) when tested by the Coded Frequency Light Emitter.

In some embodiments, the processor 166 triggers the strain gauge 180 taking measurements. For example, the processor 166 may turn on the strain gauge 180 when the processor receives input from the preload sensor 120 or the overload sensor 122 or a signal from the accelerometer indicating an alert condition (e.g. loss of preload, overload, or seismic movement such as rock fall or heavy blasting impacts). The strain gauge 180 may then collect analogue data for a more accurate assessment of current load conditions. Only triggering the analog strain gauge 180 when necessary (rather than powering it at all times) may greatly reduce energy consumption of the sensing device 100 compared to conventional sensors.

In other embodiments, preload and overload sensors may be omitted and the sensing device may include only include an analog strain gauge on a spacer.

FIG. 4A shows the rock bolt 102 and the sensing device 100 in normal operation with the preload maintained. As shown, the first and second disc springs 138 and 140 of the preload sensor 120 are compressed such that the first disc spring 138 contacts the first electrical contact 158. The third and fourth disc springs 150 and 152 are not compressed, such that the third disc spring 150 is not contacting the second electrical contact 160, because the load on the rock bolt 102 is below the overload threshold. In this state, the sensing device 100 provides output indicating that the rock bolt is functioning normally and maintaining preload tension. In some embodiments, however, no output may be generated when the rock bolt is in normal, "OK" operation in order to conserve power usage. For example, the electronics module 136 may only use power when an alert is issued or when rock bolt status is queried. As a more specific example, the sensing device 100 may include electronics (diode(s) etc.) to break the circuit of the preload sensor 120 when the first disc spring 138 contacts the electrical contact 158 to conserve power, since the preload sensor may be in that state for weeks or years at a time. The overload sensor 122, on the other hand may be the opposite and only use power when the third disc spring 150 engages the corresponding electrical contact 160.

Alternatively, output may be provided periodically when the rock bolt status is "OK". By reducing the frequency of output provided when no fault is present, or only automatically providing output from the device when alerts are necessary (due to some abnormal operation of the rock bolt), energy may be conserved and the life of the sensing device 100 may be extended. For example, using a power harvesting system of battery, the sensing device 100 may be able to function without loss of power for up to 25 or even 50 years or more. For example, a battery only powered sensing device may last over 20 years. A sensing device that harvests external power (e.g. wireless power from a leaky feeder cable) may last 50 years or more.

Figure 4B:
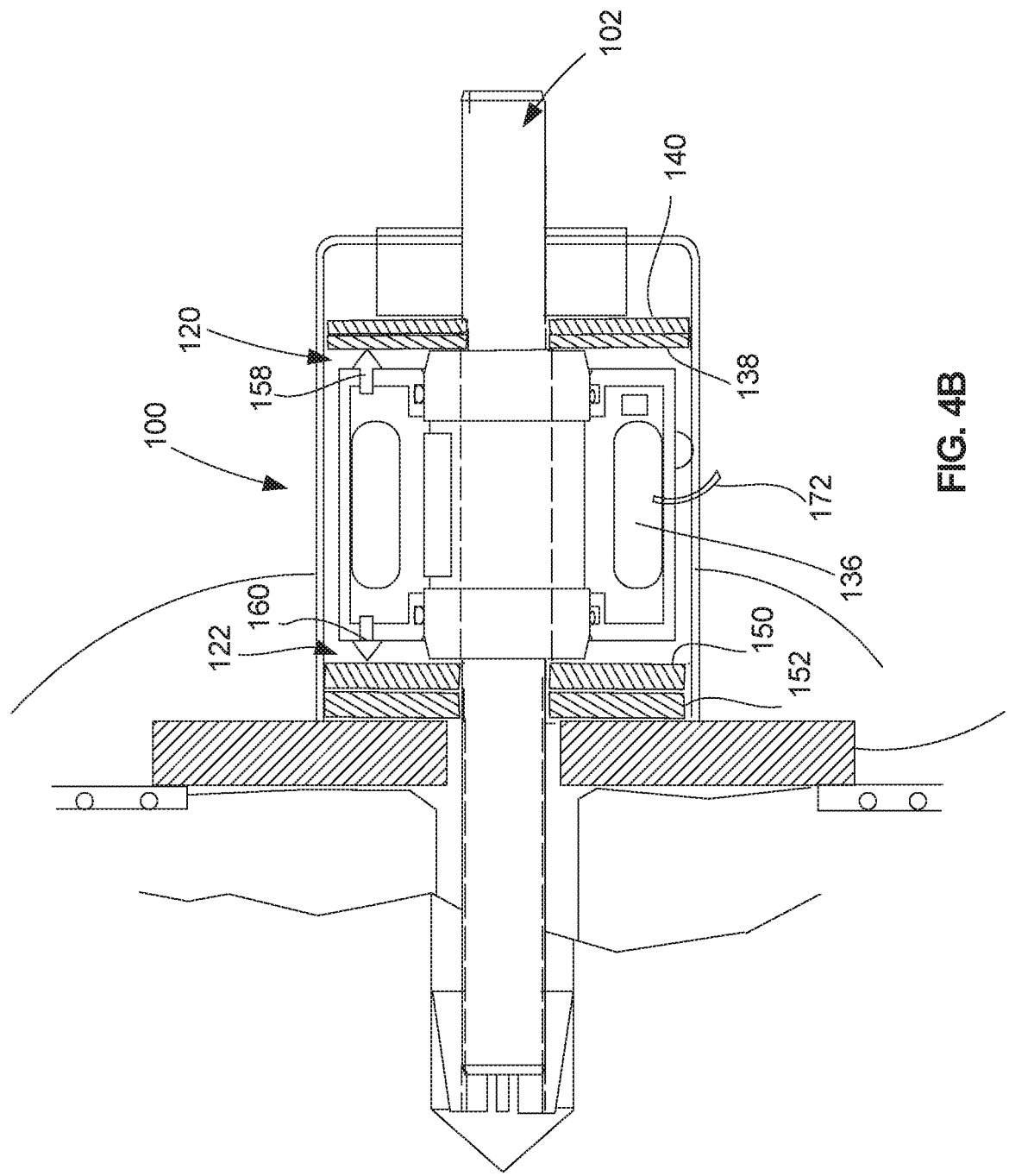
FIG. 4B is a side, partially cross-sectional view of the sensing device of FIG. 2 in an overloaded state.

FIG. 4B shows the rock bolt 102 in an overloaded state. If the load exceeds the threshold overload tension (e.g. due to over torqueing or rock displacement), the third and fourth disc springs 150 and 152 flatten, and the third disc spring 150 engages the second electrical contact 160 (thereby closing the switch in the overload sensor and producing a corresponding output from the overload sensor). In this state, both the preload and overload sensors 120 and 122 are triggered, indicating that the rock bolt is overloaded, and an appropriate status alert is output by the device 100. The alert may include one of the alert codes discussed above. The alert may be transmitted wirelessly using the transmitter 168 and the antenna 172.

Figure 5:
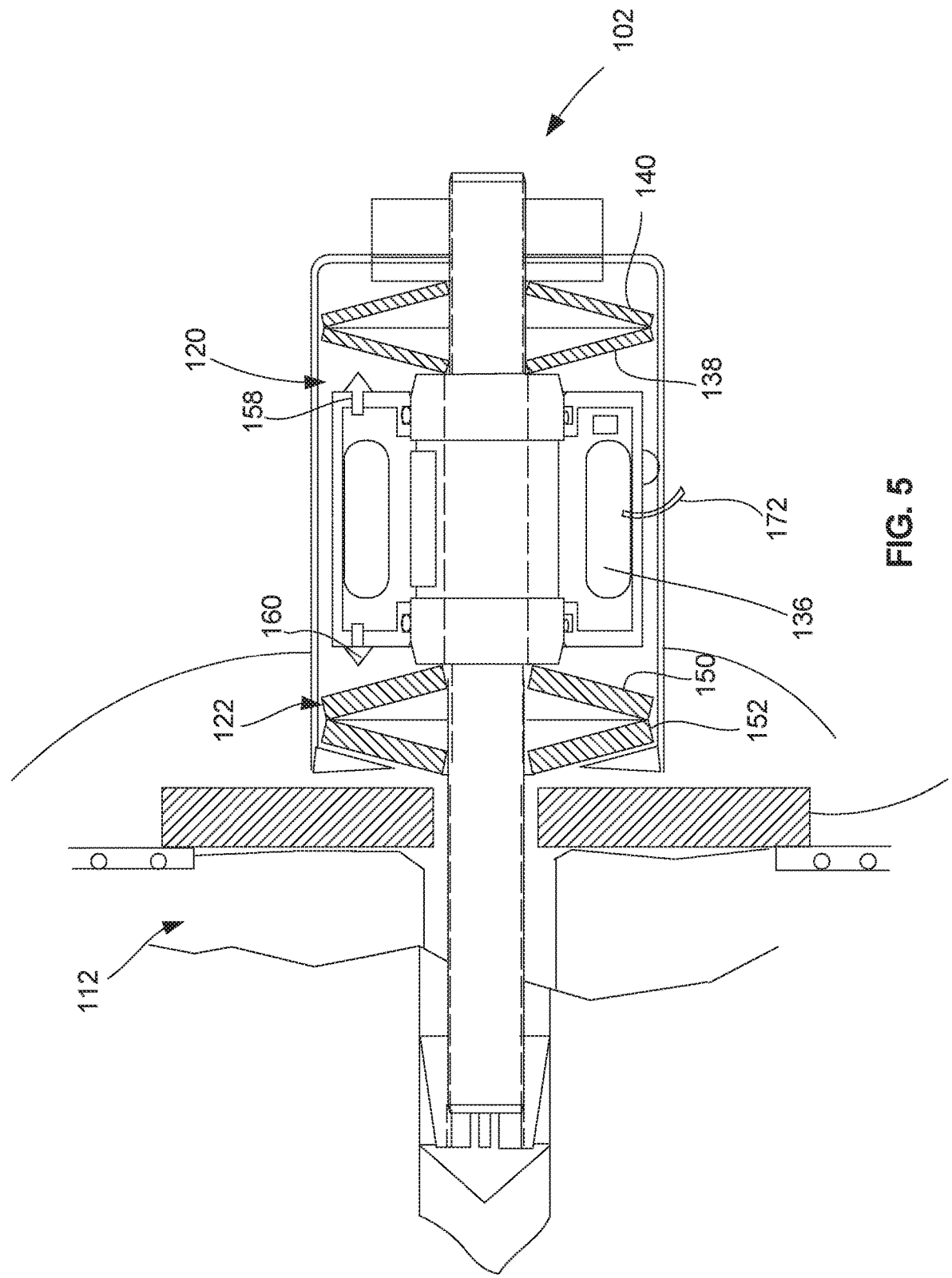
FIG. 5 is a side, partially cross-sectional view of the sensing device of FIG. 2 in loss of preload state.

The rock bolt 102 may become loose from the hole 110, or the rock in the formation 112 may break causing loss of tension in the rock bolt 102. FIG. 5 shows the rock bolt 102 displaced from the rock formation 112, with the preload tension lost. The resilient first and second disc springs 138 and 140 of the preload sensor 120 have returned to their original, non-compressed form. The force provided by the first and second disc springs 138 and 140 may partially pull the rock bolt 102 from the hole 110 when preload is lost. In this state, the first disc spring 138 no longer engages the first electrical contact 158 as shown (thus, effectively opening a switch in the sensor). The processor 166 of the electronics module 136 will cause an alert to be output (e.g. wirelessly by the transmitter 168 and antenna 172) to indicate that the rock bolt 102 has failed.

The sensing device 100 may maintain a pre-set preload in the rock bolt 102 shown in FIGS. 2 and 4A to 5, or a similar sensing device may be used to maintain a preload in other types of rock bolts, such as inflatable bolts and friction bolts.

Although the sensing device 100 in FIGS. 2 to 5 includes both a preload sensor 120 and overload sensor 122, other embodiments may only include a single sensor. For example, devices in other embodiments may include only a preload sensor (omitting the overload sensor).

In some embodiments, a sensing device (such as device 100 shown in FIG. 2) includes one or more analog tension sensors for measuring the actual load on the rock bolt, and the sensing device may provide an output indicating an exact measured load. Such output may be transmitted wirelessly or through a wired connection.

In some embodiments, a sensing device (such as device 100 shown in FIG. 2) may receive input requesting status of the rock bolt. For example, the device may be queried and respond with a code indicating normal (OK) status. Optionally, the device may include a Coded Frequency Light Sensor (opto-transistor) that may be connected to a processor (such as processor 166 in FIG. 3), and the device may provide near instant visual verification (e.g. via LED 173 in FIG. 2) to test whether the sensing device 100 is in an operational state. The Coded Frequency Light Sensor may be activated by a Coded Frequency Light Transmitter, by pointing its light beam at the Light Sensor and emitting a coded light signal to check the operational status when desired, or at predetermined intervals. Optionally, the Coded Frequency Light Sensor may be used as an energy harvester in environments with an ample light present, such as traffic tunnels, mine communication corridors, and in outdoor locations.

In some embodiments, a sensing device (such as sensing device 100 in FIG. 2) may include an antenna (such as antenna 172) and may receive wireless power to via the antenna to power the device and/or to charge a power source (e.g. battery) in the sensing device. Thus, the sensing device in some embodiments may harvest energy wirelessly. Similarly, a wired connection may be used to power and/or charge the device.

In some embodiments, output from the sensing device is transmitted to a central computer or other Central Processor Unit (CPU). For example, a computer or computer system may monitor outputs from multiple rock bolts.

In some embodiments, a sensing device (such as the sensing device 100 in FIG. 2) may sense seismic events such as blasting or rock falls or seismic movements, and the sensing device may provide an alert or alarm if the magnitude of vibrations exceed a pre-set threshold. For example, an accelerometer (not shown) may be used to measure such vibrations.

In some embodiments, a sensing device (such as the sensing device 100 in FIG. 2) may periodically perform self-testing and report results to a central computer without prodding from the central computer. The central computer may issue an alarm if expected self-testing report is not received when expected, which may allow the transmission system to be one-way, thus potentially saving on cost and energy. The sensing device may also me triggered manually or automatically to perform a self-test. For example, the sensing device may include a visible light, ultraviolet (UV) or infrared sensor (not shown) that, when exposed to a visible light, UV or infrared beam triggers the self-test.

In some embodiments, a sensing device (such as the sensing device 100 in FIG. 2) may be equipped to transmit device output in specific frequencies and/or with a particular signal strength to adhere regulations for different sites or countries. Various wireless communication networks and technologies may be implemented including, but not limited to: low frequency signals using a "leaky feeder" type loop; Wi-Fi, cellular or Internet of Things (IoT) protocol.

In some embodiments, a sensing device may not include electrical contacts for engaging the resilient compressible element, and the resilient compressible element may trigger a state change in another way. For example, a load sensor may include a proximity type sensor that is triggered by the resilient compressible element's movement. The proximity sensor may be a magnetic or capacitive proximity sensor, to name some examples.

In some embodiments, a central computer may communicate with sensing devices attached to a network or array rock bolts. The network of rock bolts may be installed in a tunnel, mine or other underground structure, for example. The sensing devices may each be similar to the sensing device 100 in FIG. 2. For example, 10 000 or more similar sensing devices may be deployed. In a network of rock bolts covering many square kilometers, the sensing devices may all report to one central computer, and the central computer may further communicate with automatic booms-traffic lights etc. The central computer can store information on status of the rock bolts (e.g. alerts that certain rock bolts have failed). For example, after a weekend break, the preceding days' stored information (including information on failure events such as overload or loss of preload) can be checked prior to workers going under-ground. In addition to providing safety by providing alerts of potential structural damage or weakness, the output/alerts from rock bolts within the network may be used to study the process of degeneration of a formation. Such output may be recorded and used for forensic research.

As mentioned above, the anchor-type rock bolt 102 shown in FIGS. 2 and 4A to 5 is only one example of the types of rock bolts that may be used with the sensing device embodiments described herein (such as sensing device 100 shown in FIGS. 2 and 4A to 5). Other types of rock bolts, such as friction and/or inflatable rock bolts, may also be used. In addition to monitoring load, the sensing devices described herein may provide a preload tension to such rock bolts as well.

In some embodiments, one or more disc springs may be used in combination with one or more flat discs to form the resilient compressible element of one or more sensors. For example, turning again to FIG. 2, the disc spring 140 and/or the spring disk 152 may be replaced with a flat washer-type plate with a hole therein. The remaining disc springs 138 and 150 may still compress to contact the electrical contacts 158 and 160. The disc spring 152 in FIG. 2 could be replace with a flat disc/washer that lays adjacent to the bearing plate 113.

Figure 6:
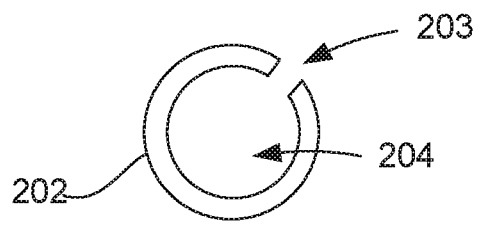
FIG. 6 is a cross-sectional profile of an example friction rock bolt.
Figure 7:
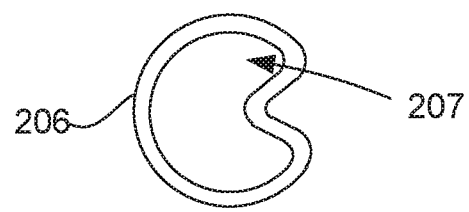
FIG. 7 is a cross-sectional profile of an example inflatable rock bolt in an uninflated state.
Figure 8:
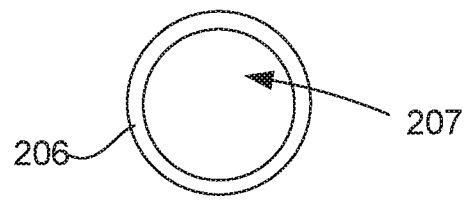
FIG. 8 is a cross-sectional profile of the inflatable rock bolt of FIG. 7 in an inflated state.

FIGS. 6 to 8 show cross-sectional profiles of conventional friction and inflatable rock bolts. FIG. 6 shows an example cross-sectional profile of a friction rock bolt 202. The friction rock bolt 202 has a generally circular cross sectional profile with a hollow center 204, but defines a slit 203 along its length. In an initial, unexpanded state the bolt 202 is placed in a hole in a rock formation (not shown). The rock bolt 202 may be slightly larger in diameter than the hole, and thus, when hammered into the hole the slit 203 will contract or spring back and the rock bolt 202 will press outward against the hole causing friction to hold the rock bolt 202 in place.

FIG. 7 shows an example cross-sectional profile of an inflatable rock bolt 206 in an uninflated state. The rock bolt defines a hollow chamber 207 that may be filled with hydraulic fluid to inflate the rock bolt 206 to the inflated state shown in FIG. 8. The inflatable rock bolt 206 will include means (such as a hydraulic fluid inlet valve, not shown) into the hollow chamber 207 for inflating the rock bolt 206. The rock bolt 206 may be inserted into a hole in the uninflated state and then inflated by a hydraulic fluid to secure the rock bolt 206 into the hole.

Unlike anchor type rock bolts, friction and inflatable rock bolts do not typically have a nut at their head end to be torqued. However, friction and inflatable rock bolts may still have an expanded ring or otherwise widened feature at their head end that protrudes from the face of the rock formation. The sensing devices described herein may abut against that ring or other widened feature at the head end of a friction bolt or inflatable bolt, as will be described below. Alternatively, friction or inflation rock bolts may be modified to include a head or plug to hold a sensing device in position, as described below.

In conventional friction and/or inflatable rock bolt installations, the rock bolts are not typically able to have a preload tension applied or maintained after installation. It may, however, be desirable to maintain a preload in such rock bolts in order to provide additional structural support. As described below, by using a sensing device as described herein, a preload may be maintained in such rock bolts. The preload may, in some embodiments, be similar in force and precision as preload in conventional anchor bolts. This preload may be beneficial to the function of the rock bolts and reinforcement of the rock formation. Friction bolts may be typically installed using a pusher rig when inserting the bolt into a rock formation. It may also allow for monitoring the load of the rock bolt (similar to the sensing device 100 described above). In the case of a friction bolt or an inflatable bolt, the bolt may typically be fit relatively snug in the hole of a rock formation once installed and grout may seldom be used.

A conventional friction or inflatable bolt may be modified with means for holding an adapter at the head end of the bolt. For example, the rock bolt may have an internal thread added so that an adapter can be screwed into the head end of the bolt. Other fastening or holding mechanisms, such as a circular clip in a groove may also be used for mounting an adapter. The adapter may be wider than the rock bolt so that the sensing device may be held between the adapter and the bearing plate. Alternatively, the adapter may have an external thread and include a nut that will function similar to the nut on an anchor bolt for both holding the sensing device and applying a preload.

In some embodiments, a conventional friction or inflatable rock bolt may be modified to include an inflation nipple on the head that allows inflation while a pusher rig is loading the bolt and the sensing device until a resilient compressible element of a preload sensor is sufficiently compressed (at the preload threshold). A light (e.g. LED) or signal may be used to indicate that the proper preload has been achieved. There are many ways to allow for the initial pushing on the rock bolt to provide preload. In one example, a plug, which acts as a stopper for hydraulic liquid to inflate an inflatable rock bolt, may be welded onto the end of the rock bolt. The plug may be of larger diameter than the bolt. The plug may have a perpendicular access nipple for inflation. Such an arrangement is shown in FIG. 9 and described below.

Figure 9:
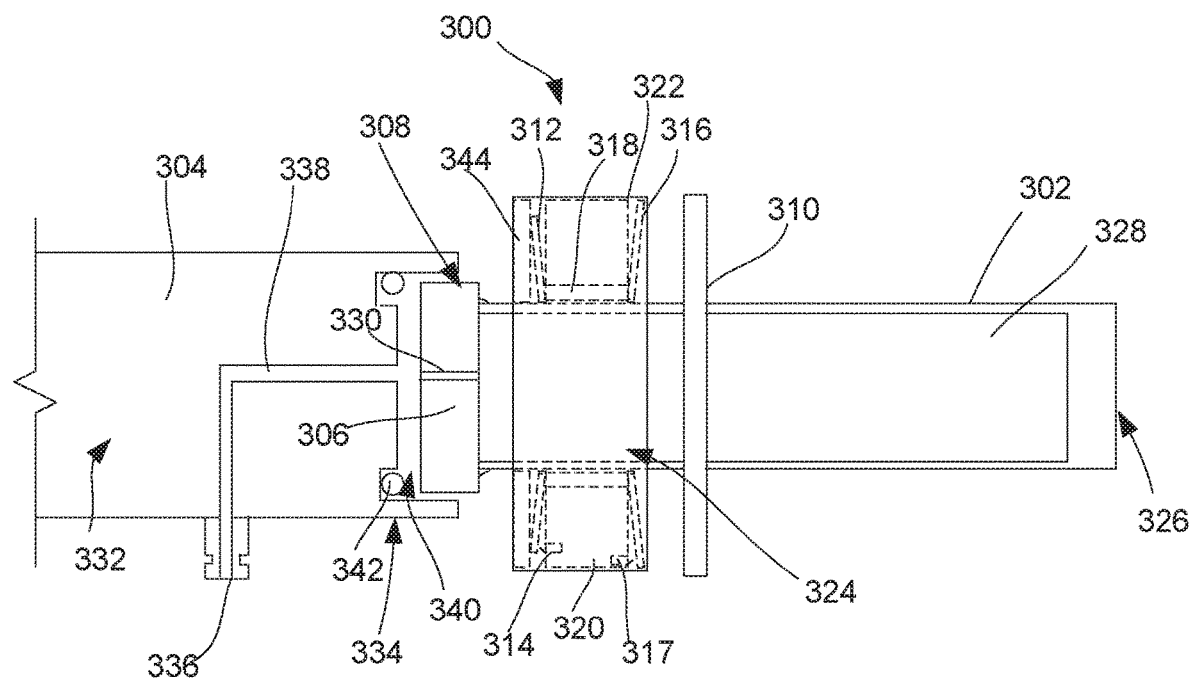
FIG. 9 is a side view of a sensing device and inflatable rock bolt according to another embodiment.

FIG. 9 is a side view of a sensing device 300 according to another embodiment and a lengthwise cross-section view of the inflatable rock bolt 302 and an inflatable bolt installation rig 304 for installing the inflatable rock bolt 302. The installation rig 304 is only partially shown in FIG. 9. The rock bolt 302 in this embodiment is an inflatable bolt with a plug type head 306 welded on its head end 308. FIG. 9 also shows a spreader washer or bearing plate 310 that would be adjacent to the face of a rock formation (not shown). The sensing device 300 includes a spacer, 318 (similar to spacer 118 in FIG. 2) first disc spring 312 and a first electrical contact 314, together forming a preload sensor switch. The sensing device 300 includes a second disc spring 316 and a second electrical contact 317, together forming an overload sensor switch. The position of the preload and overload sensor switches may be reversed in other embodiments. These sensors are arranged and function similar to the preload sensor 120 and the overload sensor 122 described above with reference to FIGS. 2 to 5. The first and second disc springs 312 and 316 are arranged at opposite ends of the spacer 318. The sensing device 300 also includes an electronics housing 320 and a device cover 322. The housing 320 optionally includes electrical components (not shown) such as, but not limited to, sensor components, processor, transmitter, receiver, power supply, and an antenna, etc. The device cover 322 covers the disc springs 312 and 316, the electrical contacts 314 and 317, the spacer 318 and the housing 320. The device cover 322 may be deformable or collapsible to allow compression of the first and second disc springs 312 and 316. The elements of the sensing device 300 within the device cover 320 are shown in stippled lines because they are normally blocked from view by the device cover 322. Similar to the sensing device 300 shown in FIGS. 2 to 5, the sensing device 300 in FIG. 9 is generally ring or tube shaped and defines a passage 324 therethrough for passage of the rock bolt 302. The sensing device in other embodiments may have a different shape (e.g. triangular or rectangular periphery). Embodiments are not limited to any particular shape.

The sensing device 300 also includes output means (not shown) for indicating the status of the rock bolt 302 based on output from the preload and overload sensors. For example, a light and/or transmission of an output signal may be used, as described above. Embodiments are not limited to any particular type of output.

The rock bolt 302 defines a hollow 328 that extends substantially along the length of the bolt 302. The plug type head 306 of the rock bolt 302 includes a hydraulic fluid inlet 330 for allowing hydraulic fluid to enter the hollow 328 for inflating the rock bolt 302.

The installation rig 304 includes a pusher section 332 with a pusher head 334 configured to fit over the head 306 of the rock bolt 302 and to push the rock bolt 302 with at least the suitable preload force. The pusher section 332 may be hydraulically driven. A conventional installation rig may not be configured to push with sufficient force, but may be modified to do so. The installation rig 304 also includes an inflation nipple 336 and internal fluid passage 338 that communicates hydraulic fluid from the inflation nipple 336 to the pusher head 334. The fluid passage 338 is aligned to communicate hydraulic fluid to the hydraulic fluid inlet 330 of the rock bolt 302 when the installation rig 304 is on the rock bolt 302. The pusher head 334 of the installation rig 304 includes a recess 340 sized to fit over the head 306 of the rock bolt 302 and an O-ring 342 within the recess 340 arranged to provide a seal and prevent leakage of hydraulic fluid from between the installation rig 304 and the rock bolt 302. The inflation nipple 336 may be connected to a source of hydraulic fluid (not shown). The particular installation rig 304 shown in FIG. 9 is provided by way of example only. Other rigs with differing structures may be used to install the rock bolt 302 with the sensing device 300. In other embodiments, installation may be manual without the use of a common installation rigs. Embodiments are not limited to any particular method of installing the sensing devices described herein. A load washer 344 is included in the sensing device 300 in this embodiment. The load washer is adjacent to the first disc spring 312 and is to be positioned against the head 306 of the rock bolt. The head 306 of the rock bolt 302 pushes on the load washer 344, which in turn pushes on the first disc spring 312.

To install the rock bolt 302, the sensing device 300 may first be placed over the rock bolt 302, while the rock bolt 302 in in its uninflated state and before the rock bolt 302 is placed (front end 326 first) in the hole of the rock formation (not shown). Next, the pusher head 334 is placed over the head 306 of the rock bolt 302 and pushes the rock bolt to apply the desired preload, which flattens the first disc spring 312 such that it contacts the first electrical contact 314. The sensing device 300 indicates that the preload is maintained accordingly either by providing an output or ceasing an output. For example, an output signal may be transmitted indicating the status as "OK", and/or an output (such as an alert transmission or light) that previously indicated an absence of preload may simply cease. Next, the installation rig 304 may insert enough hydraulic fluid into the rock bolt 302 to fully inflate the rock bolt 302 and fix it in position in the rock formation. The inflation may typically be controlled by monitoring the hydraulic pressure and automatically stopping a pump at a threshold hydraulic pressure (e.g. 300 Bar hydraulic pressure). After inflation, the installation rig 304 may be released and removed, and the rock bolt 302 is installed with a preload maintained by the first disc spring 312.

Figure 10:
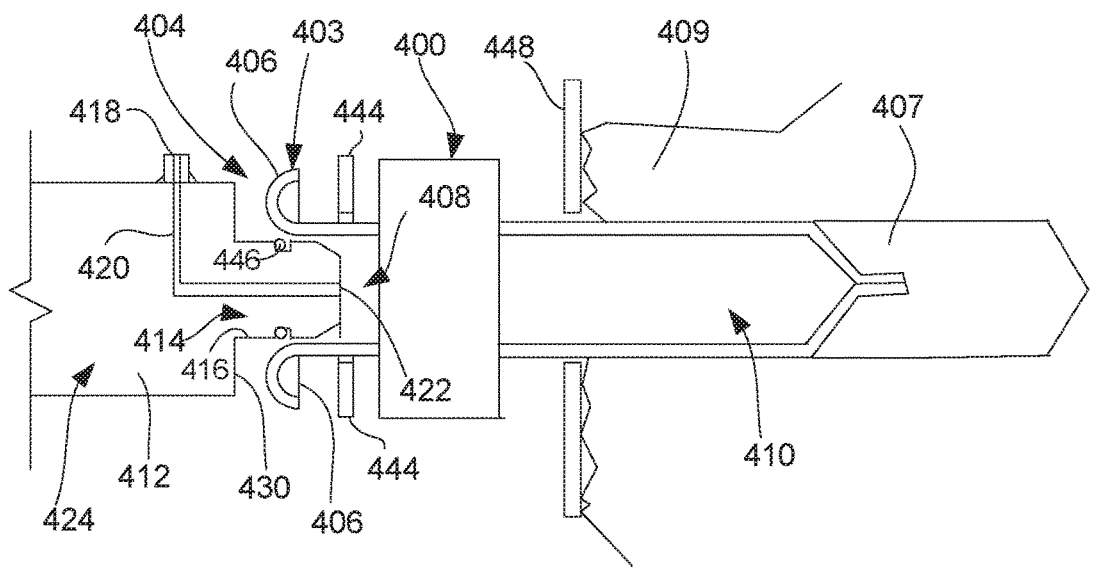
FIG. 10 is a side view of a sensing device and inflatable rock according to still another embodiment.

FIG. 10 is a side view of a sensing device 400, which is similar to the sensing device 300 of FIG. 9, but the flat load washer 444 is external to the sensing device 400 in this embodiment and is placed between the sensing device 400 and a head end 404 of the rock bolt 402. The rock bolt 402 in this example is shown in a lengthwise cross section in FIG. 10 and is similar in functionality to the rock bolt 302 described above with reference to FIG. 9. However, the rock bolt 402 has a roll-formed head 403 (rather than a welded on plug type head) at its head end 404. The rolled form head 403 has a rolled outer surface 406 extending laterally outwardly and defining a wide opening 408 into the hollow or channel 410 of the rock bolt 402. This rock bolt 402 may be installed in a hole 407 in a rock formation 409 by an installation rig 412 that is also partially shown in FIG. 10.

In this example, the installation rig 412 includes a wide hydraulic channel nipple 414 that fits into and seals the opening 408 for inflation of the bolt 402. The hydraulic channel nipple 414 in this example has an outer periphery 416 sized to snugly fit within the opening and also includes an O-ring 446 partially set into the outer periphery for sealing against the opening 408. The installation rig 412 also includes an inlet 418 connected to a fluid passage 420 for receiving fluid (not shown) for inflating the rock bolt 402.

The fluid passage 420 has a fluid outlet 422 centrally located in the hydraulic channel nipple 414.

The installation rig further includes a pusher section 424 that is wider than the hydraulic channel nipple 414. The pusher section 424 defines a flat surface 430 extending laterally away from the hydraulic channel nipple 414 that is perpendicular to the length of the rock bolt 402 during the installation process. This surface 430 presses against the rolled form head 403 of the rock bolt 402 to apply the preload. The pusher section 424 may be hydraulically driven to provide the preload, similar to the installation rig 304 discussed above with regard to FIG. 9. A bearing plate 448 is included between the sensing device 400 and the rock formation 409 in this example.

The installation rig 412 and the installation process for the rock bolt 402 is similar to the process for the rock bolt 302 described above with respect to FIG. 9.

Figure 11:
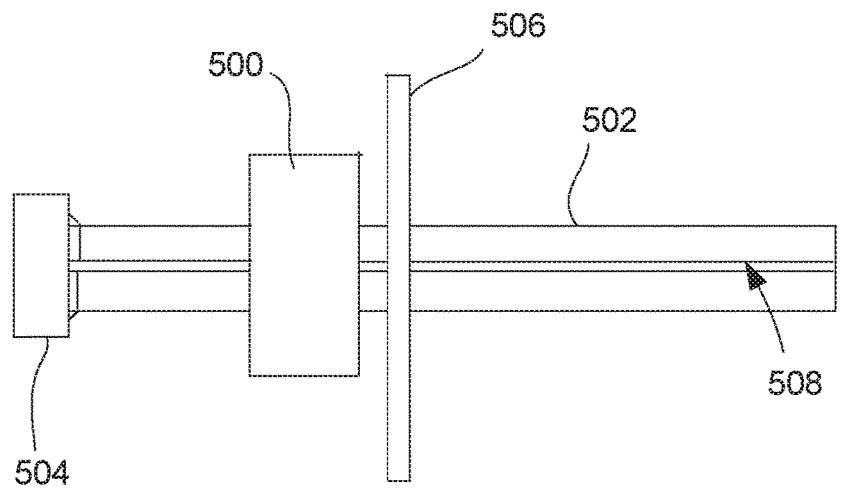
FIG. 11 is a side view of a sensing device and friction rock bolt according to another embodiment.

FIG. 11 is a side view of a sensing device 500 (similar to sensing device 300 shown in FIG. 9) used with friction rock bolt 502. A bearing plate 506 is also shown in FIG. 11. As seen in FIG. 11, the rock bolt 502 includes a slit 508 allowing contraction and expansion of the rock bolt 502 along its length as it is pushed into a hole in a formation (not shown). The rock bolt 502 has a flat head portion 504 that is wider than the remainder of the rock bolt 502. The head portion 504 may be a welded-on piece, or the rock bolt 502 may be produced integrally with the flat head portion 504. Any suitable means may be used to push the rock bolt 502 into the hole in the formation to apply the preload to the sensing device 500. After installation, the sensing device 500 will maintain the preload, similar to the sensing device 300 described above with reference to FIG. 9.

Similar to the sensing device 100 in FIG. 2, the sensing devices 300, 400 and 500 in FIGS. 9, 10 and 11 produces output that indicates the status of the respective rock bolt 302, 402 and 502. The output may indicate that the rock bolt 302, 402 or 502 is OK with the preload maintained; or the output may be a first alert indicating a loss of preload or a second alert indicating overload. This output may be based on the combination of binary output states of the preload and overload sensors as described above. The sensing devices 300, 400 and 500 may also include hardware for taking analog load measurements and generating an output accordingly. The output may be provided by a visual or audio indicator (e.g. light and/or speaker) and/or the output may be a signal that is generated and transmitted to another device, such as a central computer. Other variations and options described may also be implemented in the sensing devices 300, 400 and 500.

As discussed above, the space between a rock bolt and a surface of a hole in a formation may be filled by injected grout, epoxy or special fast setting concrete to improve the anchorage in the formation. Grouting may typically be done different ways. In one method, concrete grout is pumped in the hole of the formation before inserting the bolt. Alternatively, the concrete grout is pumped through a center hole of the bolt or through a nipple on the spreader plate after the bolt is inserted into the hole in the formation. Typically, concrete grout may require waiting approximately 10 min for the grout to set before torqueing a nut of an anchor bolt. For a friction or inflatable bolt, a pushing force is applied to the bolt until grout has set. As another alternative, epoxy may be hand injection into the hole in the formation, for example, with caulking guns. Alternatively, a hardener and a base epoxy portions within respective plastic skins are placed into the hole before the bolt, and the bolt may be used in the hole to mix the epoxy (e.g. by spinning the bolt).

Figure 12:
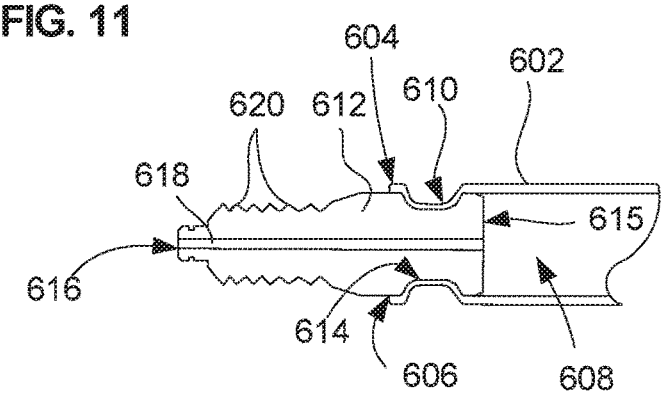
FIG. 12 is a partial side view of an inflatable rock bolt according to another embodiment.
Figure 13:
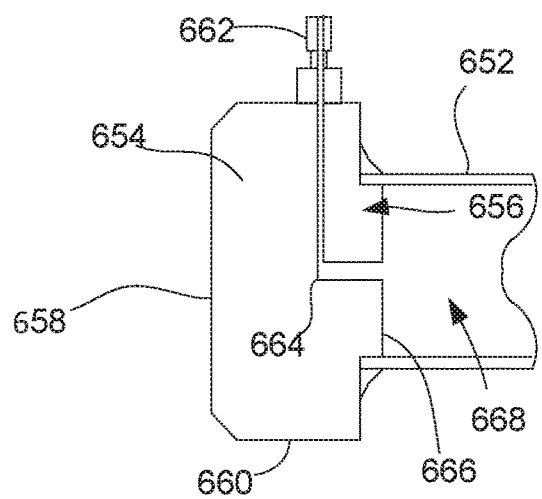
FIG. 13 is a partial side view of an inflatable rock bolt according to another embodiment.

FIGS. 12 and 13 are partial side views of inflatable rock bolts 602 and 652 respectively that illustrate still further adaptations for attaching a sensing device (such as sensing device 100, 300, 400 or 500 described above with respect to FIGS. 2 to 5 and 9 to 11. In FIG. 12, the inflatable rock bolt 602 has a head end 604 with an opening 606, and also includes a hollow chamber 608 for inflation that extends lengthwise from the head end 604 and substantially to the opposite end (not shown). The head end 604 defines an indented ring 610 (which is indented into the opening 606) around an outer circumferential periphery of the rock bolt 602. The rock bolt 602 in this embodiment is modified with a plug 612 that is shaped to be partially received in the opening 606 of the rock bolt 602. The plug 612 defines a recessed groove 614 near a first end 615 that is shaped complementary to the indented ring 610 so that the plug 612 is held in the opening 606 in a fixed position. The plug 612 is elongated and extends lengthwise from the opening 606 to a second end 616 (opposite to the first end 615). A hydraulic fluid channel 618 extends from the first end 615 to the second end 616 of the plug 612 so that fluid to inflate the rock bolt 602 may pass through the plug 612 and into the chamber 608 of the rock bolt 602. The plug 612 is threaded near the second end 616 to receive a nut (not shown) on the threads 620. A nut (not shown) similar to the nut 104 shown in FIG. 2 may be threaded onto the plug 612 and used to apply a preload to the sensing device (not shown).

FIG. 13 shows yet another inflatable rock bolt 652 similar to the rock bolt 602 shown in FIG. 12, but instead of a plug that is insertable into an opening, this rock bolt 652 includes a plug 654 welded onto the head end 656 of the rock bolt 652. The plug 654 in this embodiment has a flat end surface 658 that may be used to push the rock bolt 652 into a hole (not shown) similar to the rock bolts 302, 402 and 502 described above with respect to FIGS. 9 to 11. The plug 654 in FIG. 13 also has on outer periphery 660 extending around its circumference, with a fluid inlet 662 on the outer periphery 660 and a hydraulic fluid channel 664 from the inlet 662 to an inner end surface 666 that faces into the inner chamber 668 of the rock bolt 652.

Figure 14:
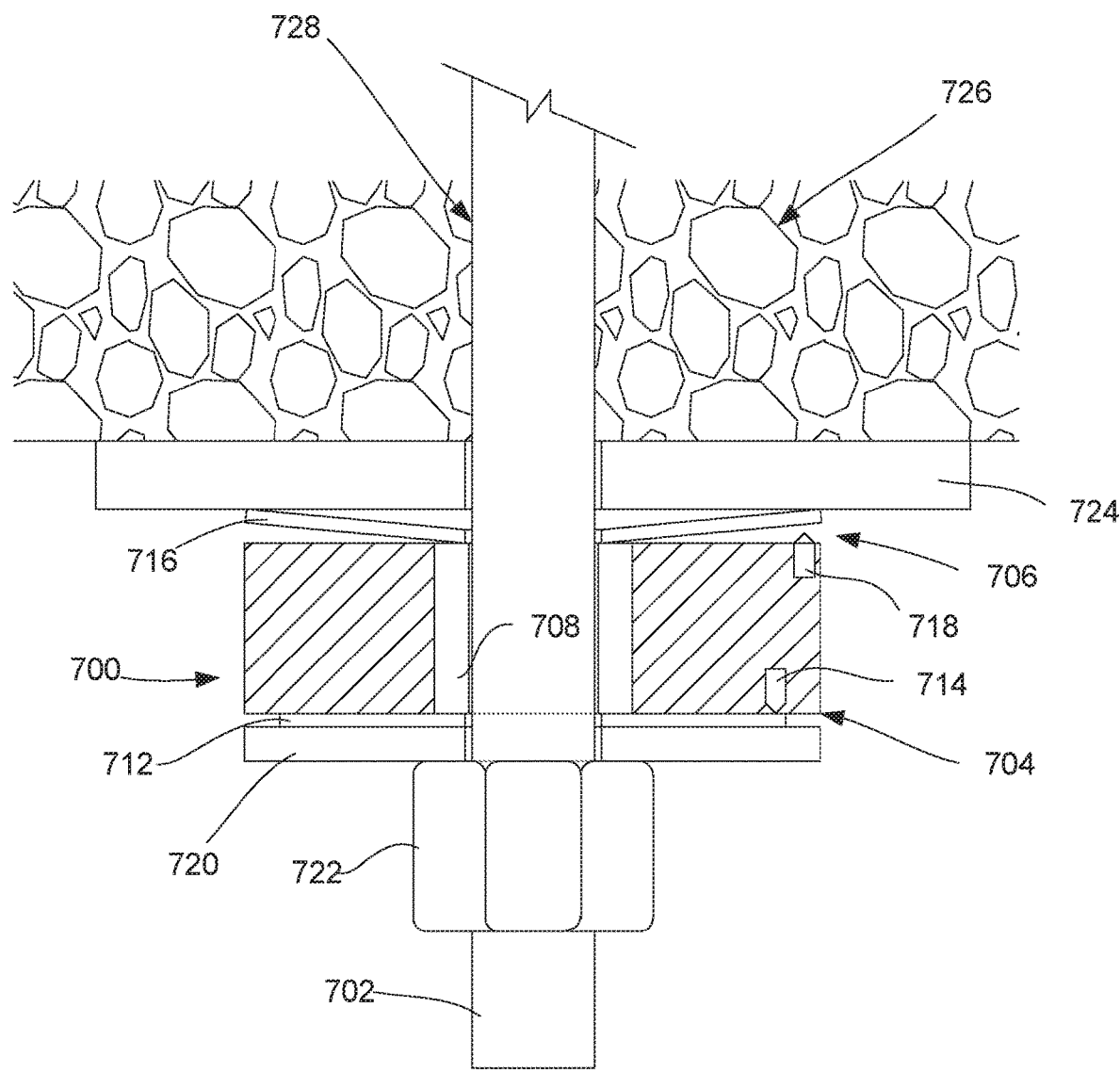
FIG. 14 is a side cross-sectional view of a sensing device according to yet another embodiment attached to a rock bolt.
Figure 15:
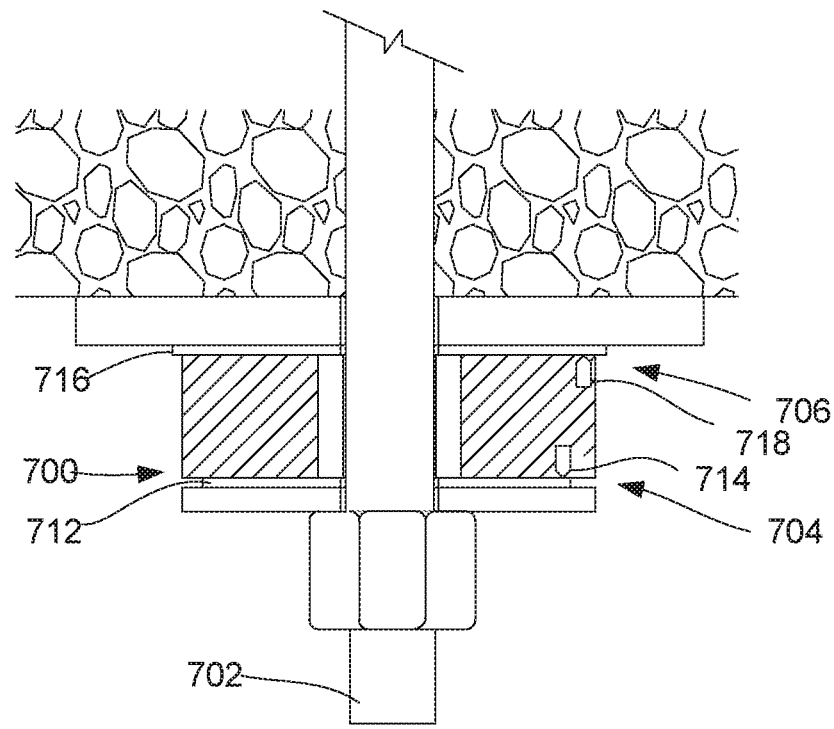
FIG. 15 is another side cross-sectional view of the sensing device of FIG. 14.
Figure 16:
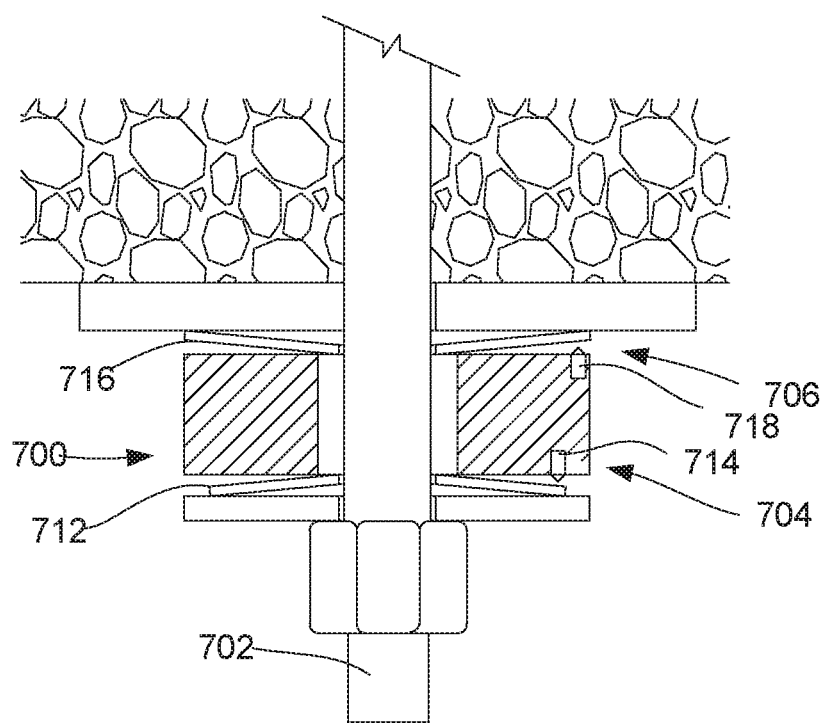
FIG. 16 is another side cross-sectional view of the sensing device of FIGS. 14 and 15.

FIGS. 14 to 16 are each side cross sectional views of a sensing device 700 according to yet another embodiment, shown attached to an anchor type rock bolt 702. With reference now to FIG. 14, this sensing device 700 includes a preload sensor 704 and an overload sensor 706 separated by a tubular spacer 708 and electronics housing 710 that surrounds the spacer 708. The sensing device 700 is similar in structure and function to the sensing device 100 shown in FIG. 2 with the rock bolt 702 passing through the sensing device 700 as shown in FIG. 14. The preload sensor 704 includes a first single disc spring 712 and a first electrical contact 714. The overload sensor 706 includes a second single disc spring 716 and a second electrical contact 718. The second disc spring 716 is stronger than the first disc spring 712, in that it requires a higher load to compress and flatten. The first disc spring 712 flattens at a preload threshold, and the second disc spring 716 flattens at an overload threshold. In this embodiment, the sensing device includes a flat washer 720 between the preload sensor 704 and the nut 722 of the rock bolt 702. The flat washer 720 bears against the first disc spring 712 to flatten the first disc spring 712 against the first electrical contact 714 when the preload is applied. The flat washer 720 may be made of any suitably rigid material capable of withstanding the loads placed on the rock bolt 702. For example, the flat washer 720 may be made of steel. FIG. 14 also shows a bearing plate 724 or spreader washer between the sensing device 700 and rock formation 726. The rock bolt 712 is installed in a hole 728 of the rock formation 726. The sensing device 700 may also include a protective cover (not shown) and/or other suitable means to protect the sensing device 700 from dust and water.

FIG. 14 shows the rock bolt 702 with a preload maintained.

FIG. 15 shows the rock bolt 702 and sensing device 700 in a first alert or fault condition. In particular, the overload condition is shown in FIG. 15, in which the second disc spring 716 is flat and contacts the second electrical contact 718, thereby triggering the overload sensor and an appropriate alarm or alert output indicating overload.

FIG. 16 shows the rock bolt 702 and sensing device 700 in a second alert or fault condition. In particular, the loss of preload condition is shown in FIG. 15, in which the first disc spring 712 and the second disc spring 716 are both uncompressed (and not contacting the corresponding first and second electrical contacts 714 and 718), thereby triggering the an appropriate alarm or alert output indicating loss of preload.

Figure 17:
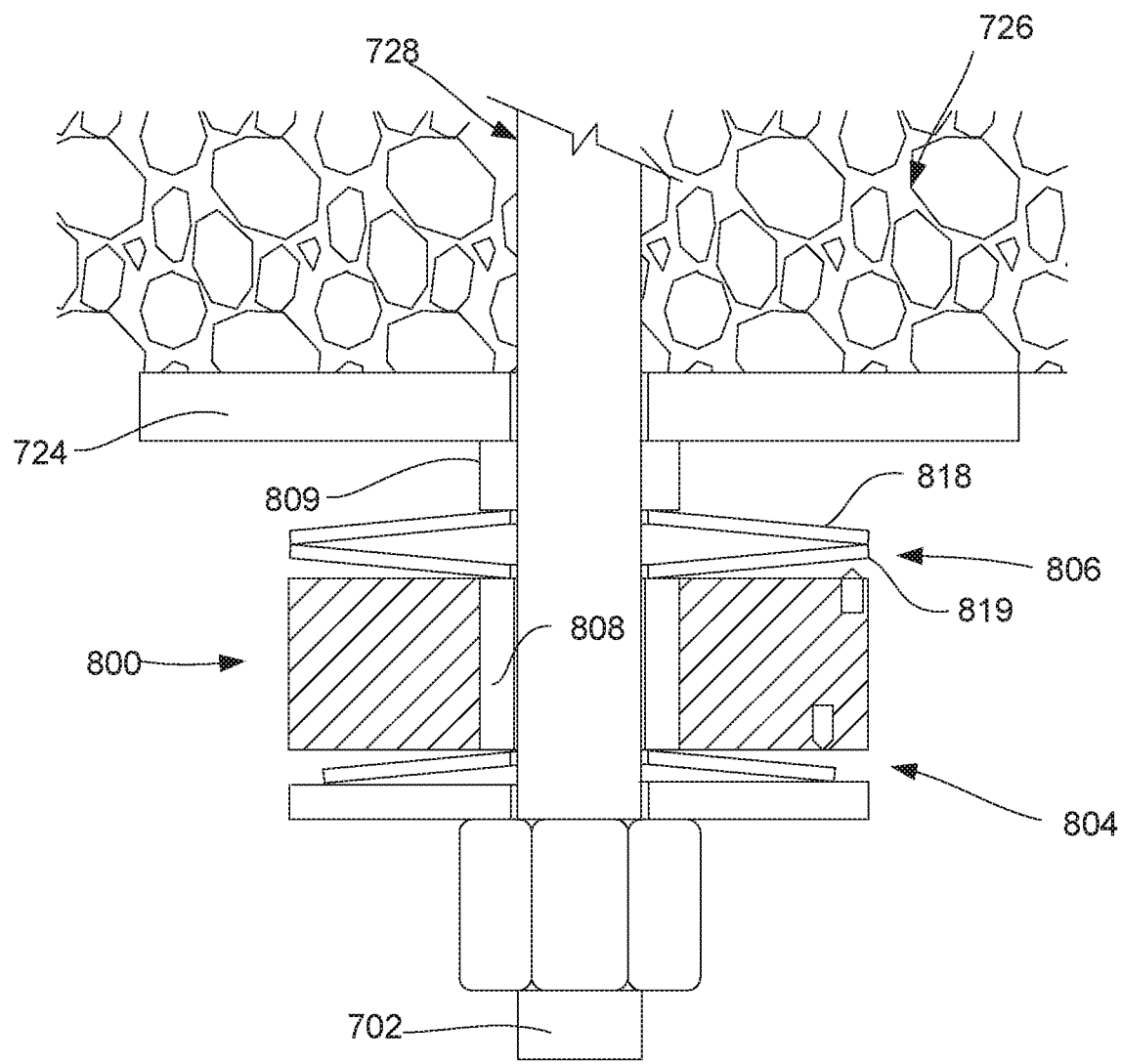
FIG. 17 is a side cross-sectional view of a sensing device according to still another embodiment attached to a rock bolt.

FIG. 17 is a cross sectional view of a sensing device 800 according to still another embodiment, shown attached to the same anchor rock bolt 702 in the hole 728 of the formation 726 of FIGS. 14 to 16. The sensing device 800 of FIG. 17 includes a preload sensor 804 and an overload sensor 806. These sensors are similar in structure and function to the preload and overload sensors 704 and 706 shown in FIGS. 14 to 16, except that the overload sensor 806 in FIG. 17 includes two disc springs 818 and 819. The disc springs 818 and 819 are arranged in parallel on the rock bolt 702 and are in a mirrored orientation with respect to one another. The sensing device 800 also includes a short, second tubular spacer 809 placed between the bearing plate 724 and the pair of disc springs 818 and 819. Otherwise, the sensing device 800 is similar in structure and function as the sensing device 700 shown in FIGS. 14 to 16.

Figure 18:
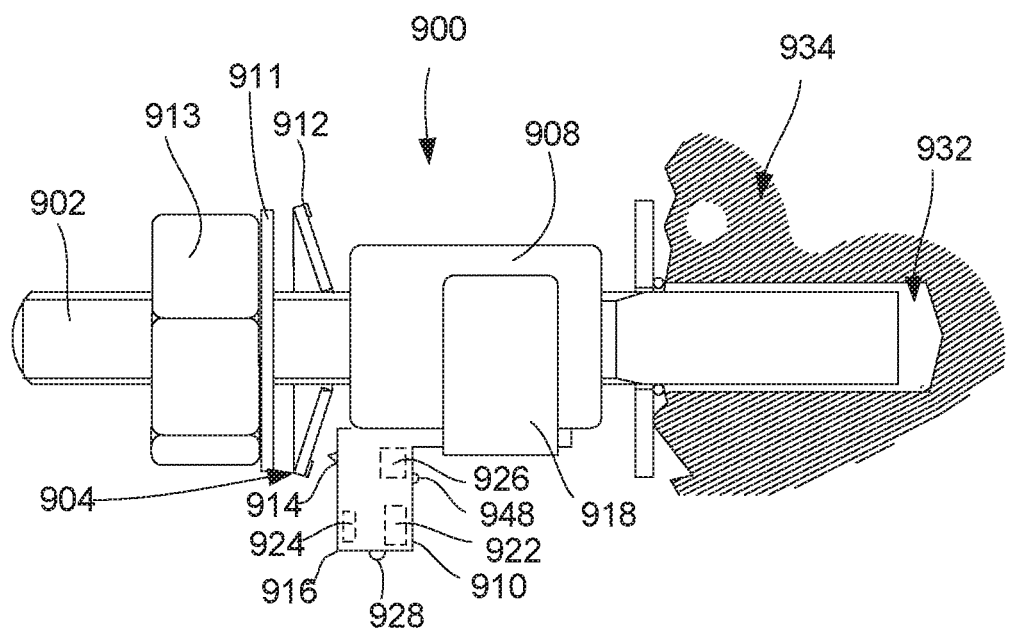
FIG. 18 is a side view of a sensing device according to yet another embodiment attached to a rock bolt.

In some embodiments, a sensing device may only include a single load sensor (e.g. only a preload sensor or an overload sensor). FIG. 18 is a side view of a sensing device 900 according to yet another embodiment attached to an anchor rock bolt 902. The sensing device 900 in this example includes a preload sensor 904, but not an overload sensor. The sensing device 900 further includes a tubular spacer 908, an electronics housing 910, and a flat washer 911. The flat washer 911 is adjacent to the nut 913 of the anchor bolt 902. The preload sensor 904 includes a disc spring 912 arranged between the flat washer 911 and the spacer 908. The electrical contact 914 is set in and and partially protrudes from the electronics housing 910, and the electrical contact 914 is arranged to contact the disc spring 912 when the disc spring 912 is compressed to a flattened state. The electronics housing 910 in this embodiment is in the form of a housing body 916 that is attached to a housing clip 918. The housing clip 918 shaped and configured to clip onto the spacer 908 to attach the electronics housing 910 to the spacer 908. The electronics housing 910 may be removable and/or replaceable. Housing clips 918 of various sizes may be used in conjunction with spacers 908 of various sizes to fit multiple sizes of rock bolts.

The electrical contact 914 is arranged in the housing body 916. Also contained in the housing body 916 in this embodiment is a processor 922, a transmitter 924, and a battery 926. A light emitting diode (LED) 928 is arranged on an outer periphery 930 of the housing body 910. The processor 922, the transmitter 924, the battery 926 and the LED 928 perform similar functions as the processor 166 transmitter 168, power source 170 and light 173 of the sensing device 100 shown in FIG. 3. The rock bolt 902 in FIG. 18 may also include an antenna 948 (shown in FIGS. 18 and 21) connected to the transmitter 924 for transmit signals (such as alerts) from the transmitter 924.

The rock bolt 902 and sensing device 900 are shown prior to a preload being applied for installation of the rock bolt 902 in a hole 932 of a rock formation 934. After installation with a preload, the sensing device 900 will provide alerts when preload tension is lost in the bolt.

Figure 19:
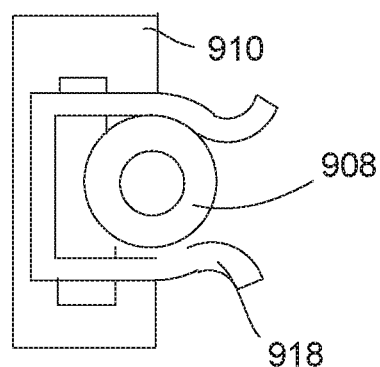
FIG. 19 is an end view of an electronics housing and spacer of the sensing device of FIG. 18.

FIG. 19 is an end view of the electronics housing 910 and spacer 908 shown in FIG. 18. The bottom profile of the clip 918 is visible in FIG. 19. The clip 918 grasps the spacer 908 with sufficient strength to hold the electronics housing 910 in position. In other embodiments, the spacer 908 may define a channel, and the clip 918 may slide into the channel to help maintain the position of the clip 918.

Figure 20:
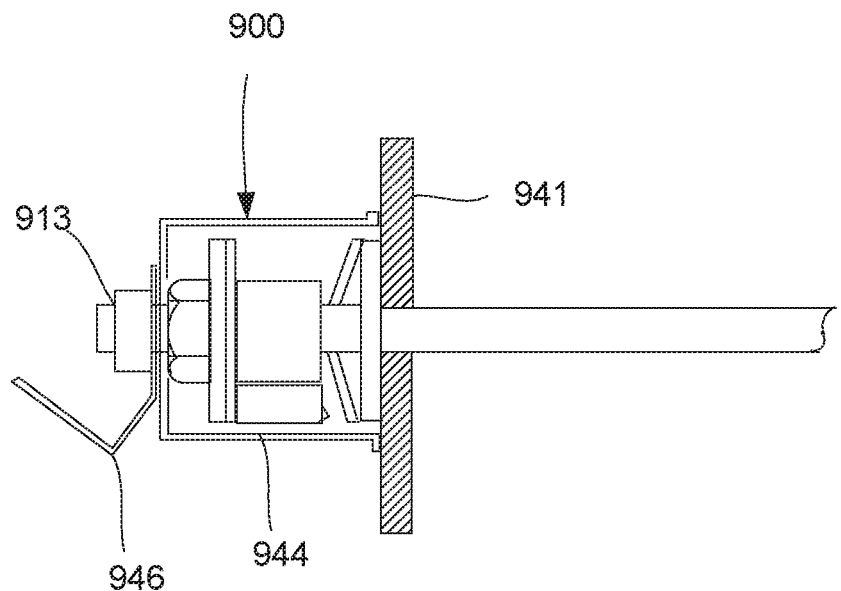
FIG. 20 is a side, partially cross-sectional view of the sensing device of FIG. 18.

FIG. 20 is a side view of the sensing device 900 and the rock bolt 902, but also showing protective cover 944 over the sensing device 900 with an ID tag 946 held by the nut 913. The ID tag 946 may be made of aluminum, for example. Bearing plate 941 is also shown in FIG. 20. The protective cover 944 is similar to the cover 174 of the rock bolt 102 shown in FIG. 2. The protective cover 944 is shown cut away to reveal the remainder of the sensing device 900 that is within the cover 944 in FIG. 20.

Figure 21:
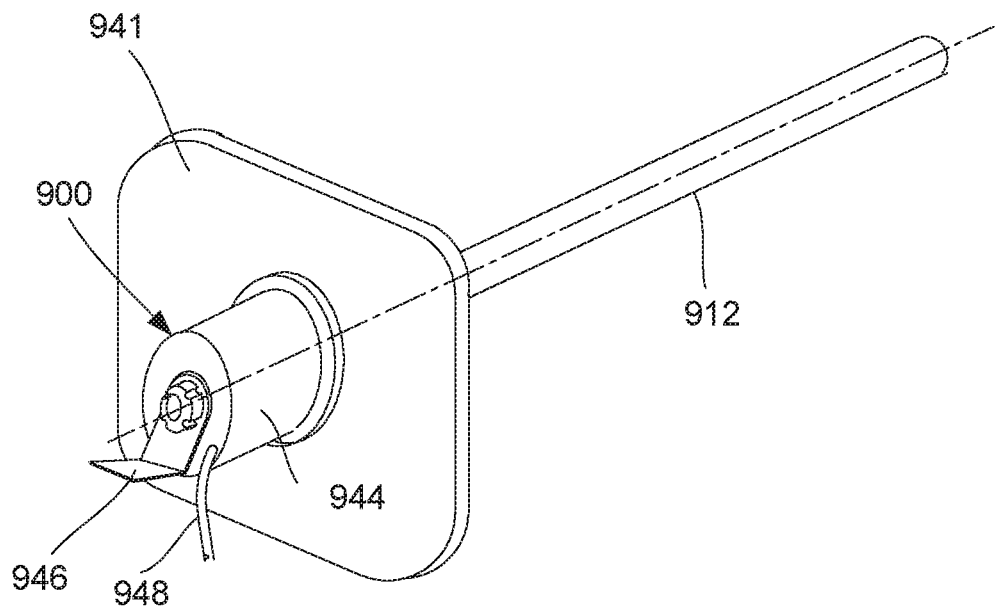
FIG. 21 is a perspective view of the sensing device of FIGS. 18 and 20.

FIG. 21 is a perspective view of the sensing device 900 (including the protective cover 944) and the rock bolt 902. FIG. 21 also shows an antenna 948 that is connected to the transmitter 924 shown in FIG. 18.

Figure 22:
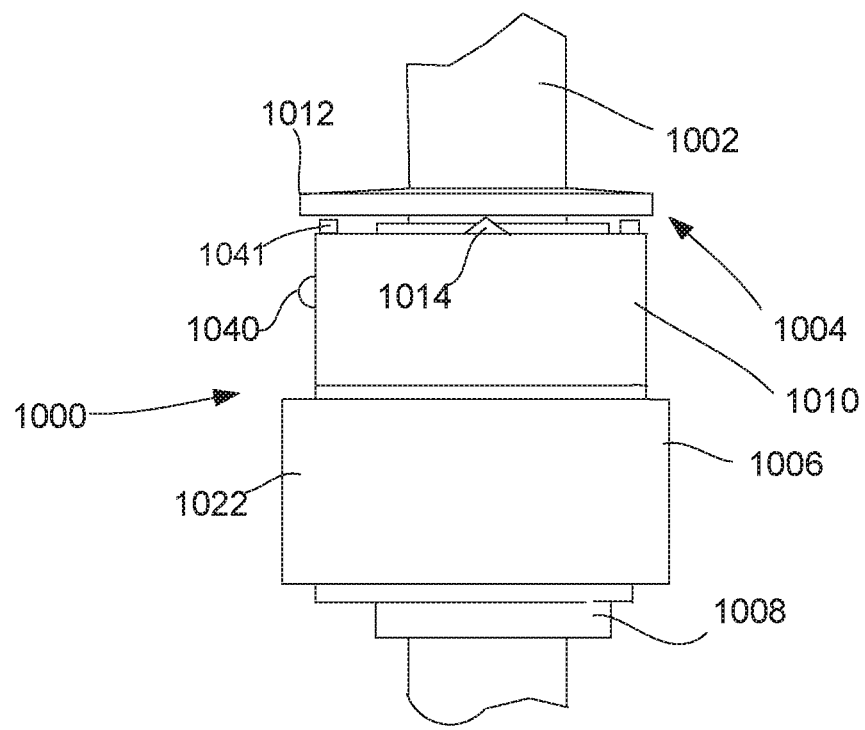
FIG. 22 is a side view of a sensing device according to another embodiment attached to a rock bolt.

FIG. 22 is a side view of sensing device 1000 according to another embodiment attached to a rock bolt 1002 (which is only partially shown). The sensing device includes a preload sensor 1004, a spacer 1008 and an electronics housing 1010. The electronics housing 1010 is again clipped to the spacer 1008, similar to the sensing device 900 shown in FIGS. 18 and 19. The preload sensor again comprises a disc spring 1012 adjacent to the spacer 1008 and an electrical contact 1014 protruding from the electronics housing 1010 and arranged to contact the disc spring 1012 when the disc spring 1012 is flat. The disc spring 1012 is shown in a compressed, flat state in FIG. 22 for illustrative purposes, despite no presence of a nut, rock formation or bearing plate that would actually provide a compressing force to the disc spring.

Figure 23:
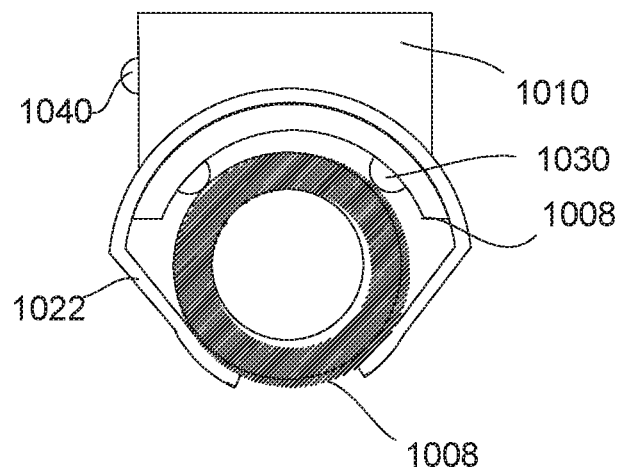
FIG. 23 is an end view of the electronics housing and spacer of the sensing device of FIG. 22.

FIG. 23 is an end view of the electronics housing 1010 and spacer 1008 of the sensing device 1000 of FIG. 22. As shown in FIG. 23, the electronics housing 1010 includes a main housing body 1006 for containing the electronics (not shown) of the sensor and a clip 1022 for holding the housing to the spacer 1008. The housing in this embodiment includes metal rivets 1030 that provide an electrical connection between the electronics of the housing 1010 and the spacer 1008, which is metal. The spacer will provide an electrical connection between the housing 1010 and the bolt 1002. The bolt 1002 in turn provides an electrical connection to the disc spring 1012, which is also metal. Thus, a complete closed circuit with the electronics in the housing 1010 is provided when the disc spring 1012 compresses and contacts the electrical contact 1014 of the housing 1010. The device 1000 also includes an LED 1040 on the housing. The device 1000 provides output (e.g. light and/or signal transmission) indicating whether or not the preload is maintained similar to the other devices described herein. The rivets 1030 may hold a voltage that is transferred through the spacer 1008 and the rock bolt 1002 to the disc spring 1012. Thus, the voltage may be transferred through the electrical contact 1014 to electronics (not shown) in the sensing device 1000 when the disc spring 1012 is compressed and engages the electrical contact 1014. A processor in the electronics housing (not shown) or other electronics may thereby detect when the disc spring 1012 is compressed and engages the electrical contact 1014.

The sensing device 1000 also includes stoppers 1041 (e.g. rubber stoppers) on the housing that are flush with or slightly lower than the electrical contact 1014 to protect the housing 1010 from the disc spring 1012.

Figure 24:
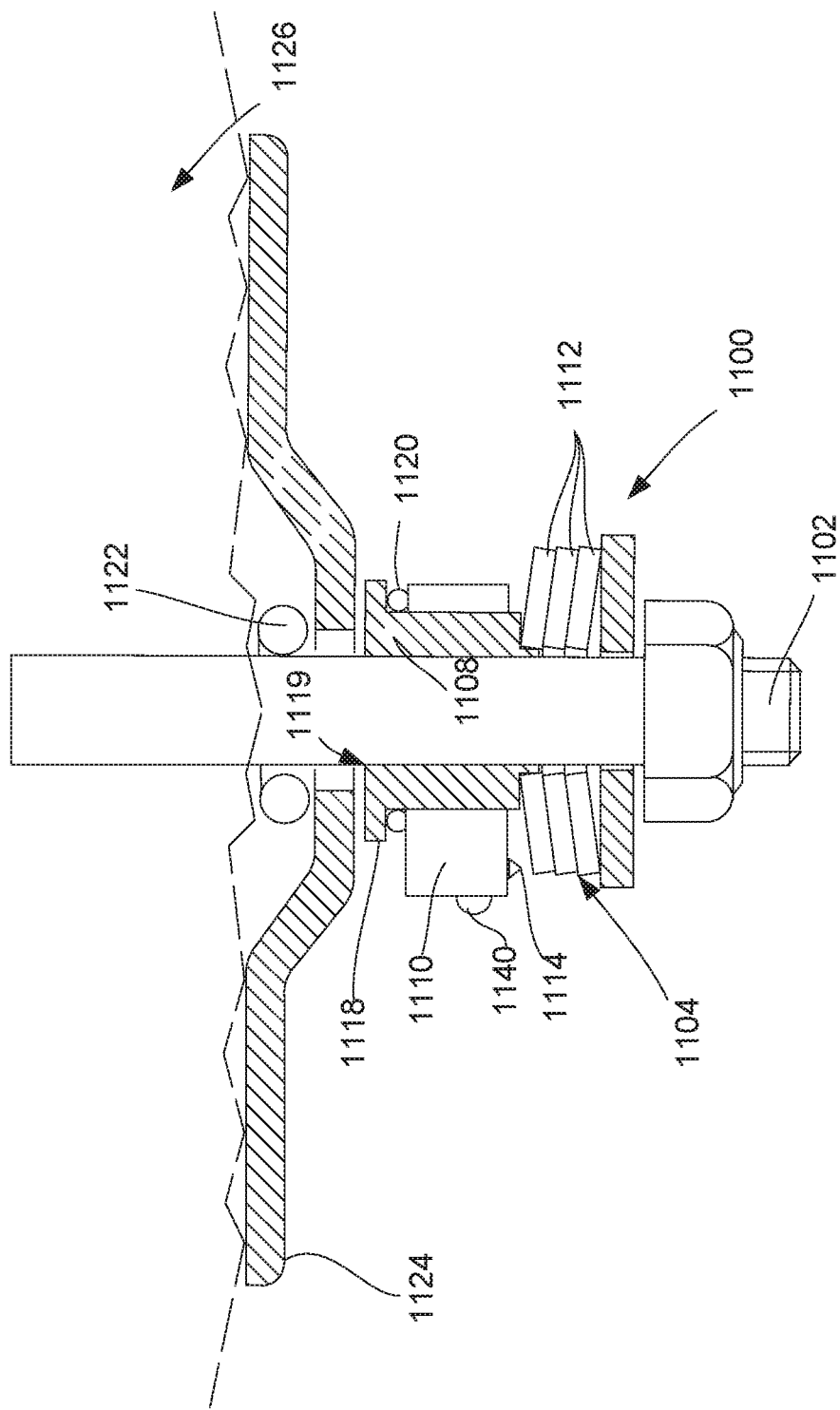
FIG. 24 is a side cross-sectional view of a sensing device according to another embodiment attached to a rock bolt.

FIG. 24 is a side cross-sectional view of a sensing device 1100 on a rock bolt 1102 according to yet another embodiment. The sensing device 1100 is structurally and functionally similar to the sensing device 900 shown in FIG. 18 and includes a preload sensor 1104, a tubular spacer 1108 and an electronics housing 1110. However, in this example, the preload sensor 1104 includes three similar disc springs 1112 arranged in parallel and similarly oriented as shown in FIG. 24. The three disc springs 1112 are chosen to, together, compress to a flattened state to contact electrical contact 1114 at the desired preload threshold. The spacer 1108 in this embodiment has an outwardly extending flange 1118 at a bottom end 1119 of the spacer 1108, and a rubber O-ring is included between the flange 1118 and the electronics housing 1110. The O-ring 1120 may slightly compress (e.g. up to 0.5 or 1 mm) in the presence of the preload tension and the electrical contact 1114 is arranged to allow for said compression of the O-ring 1120 and still contact the disc springs 1112 when preload is applied. FIG. 24 also shows LED 1140 on the electronics housing 1110. In this embodiment, a foam rubber O-ring 1122 is also included around the rock bolt 1102 and between the bearing plate 1124 and the rock formation 1126.

In some embodiments, a preload sensor and/or an overload sensor may not include an electrical contact and/or corresponding disc spring. For example, other resilient compressible elements and triggering mechanisms may be used. In some embodiments, a magnetic (rather than electrical) trigger may be implemented in the sensor(s). For example, a resilient compressible element may trigger a magnetic sensor (rather than requiring the compressible element to engage an electrical contact).

In different applications, different levels of precision or tolerance for triggering alerts may be desired. In some embodiments, the distance that the compressible element(s) of the sensing device moves when compressing may vary to provide a desired sensor precision and/or tolerance. The size of the electronic housing (which includes electrical contacts or other sensor components in some embodiments) may also vary in size, length and/or position on the spacer.

In some embodiments, the preload and/or overload sensors may include a proximity sensor (such as a capacitive proximity sensor) rather than an electrical contact to sense movement of the compressible element (such as a disc spring). A proximity sensor may be integrated into the electronics housing (in place of an electrical contact) and may be stationary relative to the housing. If multiple proximity sensors are used (e.g. one for the preload sensor and one for the overload sensor, the proximity sensor may be adjusted for trigger tolerance independently.

A capacitive proximity sensor may have a design tolerance regarding the distance of the compressible element from the sensor that will trigger an alert. For the preload sensor, the tolerance may be how far away the proximity sensor the disc spring can move (un-compress) before an alert is triggered. For the overload sensor, the tolerance may be how close towards the proximity sensor the disc spring can move (compress) before an alert is triggered. The tolerance may be in the range of approximately 1 mm to 2 mm for example, but embodiments are not limited to any particular tolerance level.

For the preload sensor, the proximity sensor and a disc spring may be chosen and arranged such that the preload sensor senses when the compressible element is flat (compressed). The distance from the flat disc spring to the proximity sensor may be, for example, 4 mm. Then, if the disc spring is expands due to loss of preload and moves 1 to 2 mm away from the proximity sensor, the proximity sensor may trigger an alarm. Shims may be used to provide the necessary spacing between the disc spring (or other compressible element) and the proximity sensor. Similarly, for an overload sensor, the proximity sensor may trigger an alarm if the washer is flattened, thus moving to a position about 4 mm from the proximity sensor. These example distances between the disc spring and the proximity sensor are given by way of example only.

Shims may each be, for example, approximately less than 1 mm thick (e.g. 0.4 mm). Shims of varying thicknesses may be used as desired for different implementations. If a sensing device is providing false alarms, addition or removal of shims may be used to adjust the calibration and/or tolerance of the preload or overload sensor accordingly.

Figure 25:
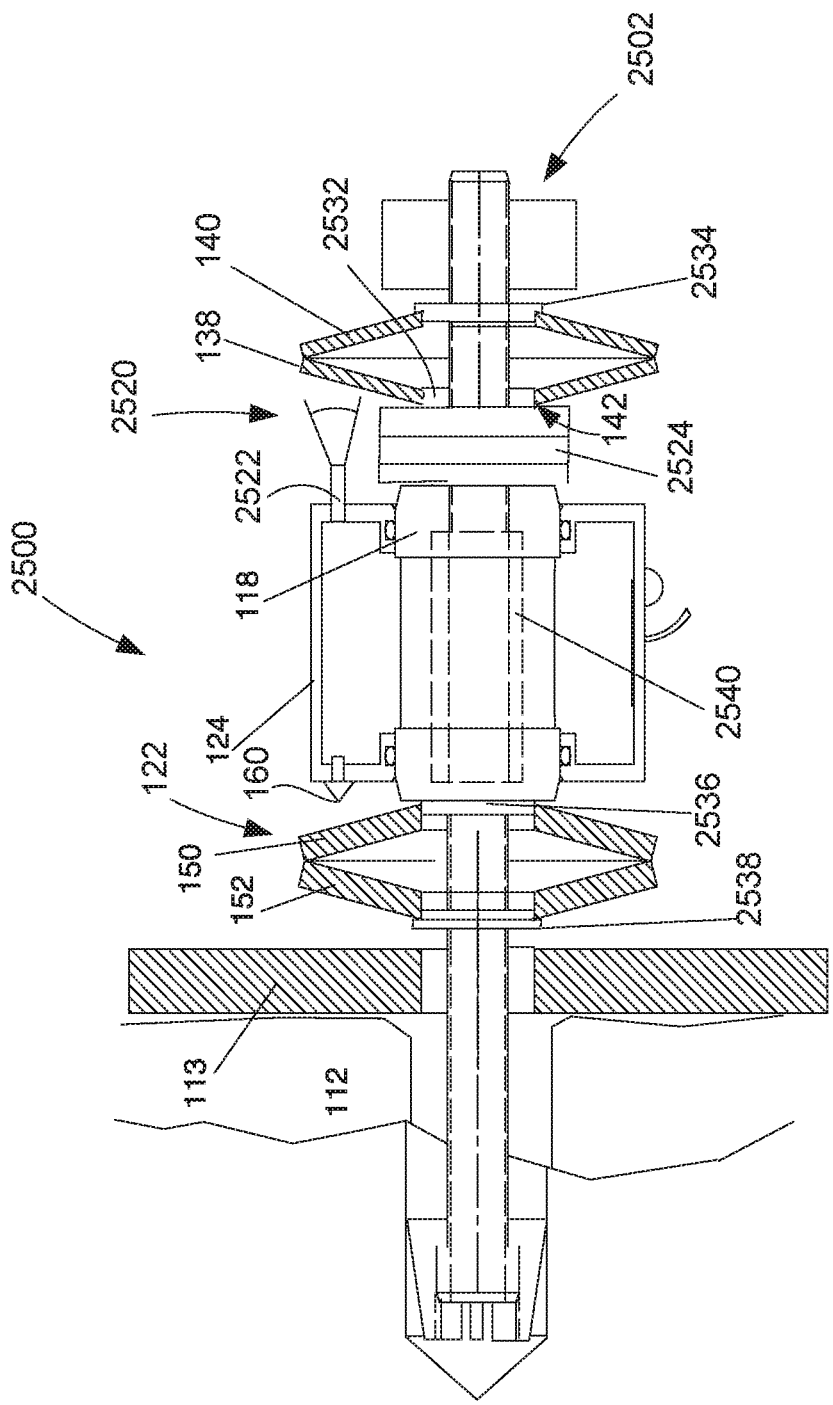
FIG. 25 is a side partial cross-sectional view of a sensing device on the rock bolt according to yet another embodiment.

FIG. 25 is a side partial cross-sectional view of a sensing device 2500 on the rock bolt 2502 for installation in the rock formation 112. The sensing device 2500 is a modified version of the sensing device 100 shown in FIG. 2. The sensing device 2500 includes the same overload sensor 122 including the third and fourth disc springs 150 and 152 and the corresponding electrical contact 160. The preload sensor 2520 in this embodiment still includes the first and second disc springs 138 and 140. Rather than an electrical contact, the preload sensor includes a proximity sensor 2522 that senses the proximity of the first disc spring 138. The proximity sensor 2522 is integrated in the housing 124 and connected to a processor (not shown) in the housing 124, which is similar to the processor 166 of the sensing device 100 shown in FIG. 2. The proximity sensor 2522 is positioned and calibrated to trigger when the first disc spring 138 is flat (compressed). The proximity sensor 2522 is arranged at an end of the electronics housing 124 facing the first disc spring 138 in this example.

In order to provide sufficient distance from the proximity sensor 2522 to the first disc spring 138, additional shims 2524 (e.g. washers) are placed between the spacer 118 and the first and second disc springs 138 and 140. The desired distance between the proximity sensor 2522 to the first disc spring 138 may vary depending on the type and specifications of the proximity sensor 2522 and embodiments are not limited to any particular distance or configuration.

As discussed above, rock bolts may have various sizes, including various diameters. The rock bolt 2502 in FIG. 25 has a smaller diameter than the rock bolt 102 shown in FIG. 2. To allow the sensing device 2500 to fit on both sizes of rock bolt, four adaptor washers 2532, 2534, 2536 and 2538 are used together with adaptor sleeve 2540. The first adaptor washer 2532 is sized to fill the gap between the first disc spring 138 and the rock bolt. Specifically, the inner diameter of the first adaptor washer 2532 is sized slightly larger than the diameter of the rock bolt 2502, and the outer diameter of the first adaptor washer 2532 is sized slightly smaller than the central hole 142 of the first disc spring 138. The first adaptor washer 2532 then fits within the central hole 142 of the first disc spring. The second, third and fourth adaptor washers 2534, 2536 and 2538 similarly fit within the second, third and fourth disc springs as shown in FIG. 25. The adaptor sleeve 2540 is tubular and sized to fit between the spacer 118 and the rock bolt 2502. The adaptor sleeve 2540 is shown in stippled lines to indicate that is hidden from view by the spacer 118. Specifically, the outer diameter of the adaptor sleeve 2540 is slightly smaller than the inner diameter of the spacer 118 and slightly larger than the outer diameter of the rock bolt 2502. The adaptor sleeve 2540 is shorter than the spacer 118 in this embodiment, but may be longer (e.g. the same length as the spacer 118) in other embodiments. Together the adaptor washers 2532, 2534, 2536 and 2538 and the adaptor sleeve 2540 function as an adaptor kit allowing a single sensing device to be modified to fit multiple sizes of rock bolts (i.e. a first size without the adaptor kit and a second size with the adaptor kit).

Adaptor kits for rock bolts of various sizes may be used. Standard spacers and disc spring sizes with prefabricated hole sizes may be adapted for smaller diameter bolts. This may reduce the cost of producing the sensing device to service a number of smaller diameter bolts. Embodiments are not limited to any particular rock bolt length or diameter. Example rock bolt outer diameters may be approximately 22 mm, 30 mm, ¾" or ⅝".

Various embodiments of the sensing devices described herein include mechanical resilient compressible elements (e.g. disc springs) for load sensors may be relatively simple and inexpensive to build and install compared to conventional sensors. The sensing device may be used with some rock bolts (e.g. anchor type bolts) without the need to customize the bolt or the installation method. The sensing device may be simple to set and calibrate, and special calibration instruments may not be needed during installation. The sensing device may be able to withstand a load higher than the overload limit of the rock bolt. The load sensors may be resistant to damage and provide sufficiently consistent triggering despite changes in temperature, moisture and energy levels. As described above, a battery may be sufficient to power the sensing device for up to 25 to 50 years. Various signal and communication protocols may be used for communicating output from the sensing device. As will be appreciated, in some embodiments, the electronics housing may be removable and replaceable without relaxing the preload on the rock bolt. The sensing device may be low cost and the mechanics of the device may be easily understood and armed/calibrated by a user. The disc springs used in some embodiments may be color coded to designate their tonnage to aid in the assembly process.

The sensing devices described herein may be made using various materials. Disc springs, for example, may be made of steel, plastic or other materials having the proper spring like properties. Other types of resilient compressible elements having similar characteristics as disc springs may also be used.

The sensing devices described herein may consist of modules to allow for a relatively small inventory of standard parts to be built into a large number of variations and dimensions, and to set desired preload and overload threshold as needed to cover the maximum of rock bolt and load variant to be covered by minimum of inventory. For example, disc springs of various strengths may be chosen for the rock bolts to provide the desired threshold calibrations. In some embodiments, the disc springs may be swappable to allow a single sensing device design to be modified to provide a variety of different preload and overload thresholds. Such disc springs may be standard parts that can then be used to customize the sensing device(s). The sensing devices may be assembled or modified in the field based on a cache of stock parts (e.g. disc springs), and no electronic calibration may be required for the customization, thereby simplifying the customization/configuration process. Conventional sensors may require substantial re-designs, sensor circuitry reconfigurations or customizations for use in multiple different applications. It will be appreciated that several different types of sensing devices as described above may be installed in many of different applications with many different overload and preload threshold levels. The modular nature of the sensing devices (by replacement of the disc springs or other compressible elements) to calibrate the threshold levels may simplify the assembly and installation process as well as manufacturing costs in comparison to conventional sensors. The modular and adaptable nature of some embodiments of the sensing devices described herein may also allow for easier inventory management. These possible benefits may be amplified for networks consisting of high numbers of rock bolts.

Rock bolts are often installed in clusters and may be of different types and dimensions and the preload and overload specifications will be different from cluster to cluster or even bolt to bolt. The installation data related to each individual bolt may be stored in a central computer (such as the central computer 62 shown in FIG. 1). When using temporary clusters of rock bolts near blasting sites the sensing devices may be removed and reused on next temporary cluster of rock bolts. A G-force sensor may be included in the sensing devices and may report on seismic movement and blast impacts/vibrations at the rock bolt site. Such reports may be stored by the central computer.

The sensing devices of some embodiments described herein may continue to function after an overload alert is triggered, and some further increase in load may not affect the sensor or the rock bolt. So long as the rock bolt does not displace or break, the compressible element of the overload sensor may still bounce back (uncompress) if the load decreases. The central computer (such as the central computer 62 shown in FIG. 1) may record than an overload event occurred and identify where it happened.

Tolerances in the preload and/or overload threshold may be provided to account for variances or tolerances in installation equipment (e.g. pusher rigs or torqueing rigs) in order to facilitate efficient installation.

The sensing devices described herein may be water resistant and/or the electronics housing may be hermetically sealed such that the sensing devices may be used in submerged environments (e.g. in a dam or hydro station). In such submerged implementations, the sensing devices may be wired to a computer at the surface for communicating status signals (alerts, etc). Sensing devices described herein may, in some embodiments, have Intrusion Protection (IP) 68-300 feet. In some embodiments, the sensing devices may have IP 68-1000 feet.

The sensing devices described herein may be provided in various sizes. Some embodiments may be have an outer diameter of 3 inches, for example. In one embodiment, the sensing device may require about 2.5 inches of space between a spreader plate and the nut of an anchor rock bolt.

FIG. 26A is a side view of a rock bolt 2602 with a sensing device 2600 similar to the other sensing devices described above. The rock bolt 2600 is installed at an angle (with respect to the surface 2620 of the rock formation 2622) in hole 2610. A wedge 2604 with a triangular side profile is inserted between the bearing plate 2612 and the sensing device 2600 to provide a surface 2613 substantially perpendicular to the sensing device 2600 for the sensing device 2600 to push against.

FIG. 26B is a side view of the rock bolt 2602 and sensing device 2600 again at an angle in hole 2610. In this embodiment, the spreader plate 2614 is a standard self-aligning spreader plate with a central dome shape portion 2615. A wedge 2613 fits fit over the dome shaped portion 2615 and between the bearing plate 2612 and the sensing device 2600 and again has a surface 2617 that is substantially perpendicular to the sensing device 2600 for the sensing device 2600 to push against.

FIGS. 27A and 27B show side and top views respectively of the wedge 2604 from FIG. 26A. Any suitable wedge may be used to provide better alignment of the sensing device.

The space between the outer cover of the sensing device and the internal components (e.g. electronics housing etc.) may be filled with an elastomer material. This elastomer filling may reduce the impact on electronics and other components of the sensing device. For example, damage from heavy impacts such as blasting in the vicinity of the sensing device may be reduced.

A rock bolt sensing device according to yet another embodiment will now be described with reference to FIGS. 28 to 33.

FIG. 28 is a side view of a rock bolt sensing device 2800, according to yet another embodiment, shown mounted on a rock bolt 2802. The rock bolt 2802 is shown only by way of example, and the sensing device 2800 may be used with other bolt types. The sensing device 2800 includes a first coned-disc spring 2804, a second coned-disc spring 2806, and a donut-shaped electronics housing 2808 there between. A spacer 2810 (shown in FIG. 29) fits over the rock bolt 2802 and sits between the first and second disc springs 2804 and 2806. The donut-shaped housing 2808 extends around the circumference of the spacer 2810. The sensing device 2800 in this embodiment includes optional first and second washer-like plates 2812 and 2814 that receive the rock bolt 2802 therethrough and sit against the first and second disc springs 2804 and 2806 respectively.

FIG. 28 also shows bearing plate or spreader washer 2816, which will sit against a rock face when the rock bolt 2802 is installed. A dome 2818 sits between the spreader washer 2816 and the sensing device 2800 and may help evenly distribute force sensing device 2800 when the rock bolt 2802 is installed at a non-perpendicular angle with respect to the rock face.

As tension is applied to the rock bolt 2802, the nut 2820 of the rock bolt 2802 presses on the first plate 2812, which in turn presses against the first disc spring 2804. The dome 2818 presses against the second plate 2814, which in turn presses against the second disc spring 2806. The plates 2812 and 2814 may help distribute tension around the circumference of the disc springs.

FIG. 29 is an exploded perspective view of the sensing device 2800. The first and second disc springs 2804 and 2806 and the first and second plates 2812 and 2814 are removed in FIG. 29 so that other components of the sensing device 2800 are visible. As shown, the spacer 2810 is split and comprises first spacer piece 2822a and second spacer piece 2822b. The electronics housing 2808 similarly comprises first and second pieces 2824a and 2824b, which snap together or otherwise engage each other to form the complete housing 2808. The sensing device 2800 also includes an electronics board 2825 (e.g. PCB) that sits in the electronics housing 2808 and includes circuitry as discussed below. In this embodiment, the electronics board 2825 is washer-shaped to fit within the donut shaped electronics housing 2808, although embodiments are not limited to any particular structure for electronic components including the board.

When assembled, the spacer 2810 is secured mainly within the housing 2808, but with opposite first and second ends 2826 and 2828 protruding from the housing 2808. The first spacer piece 2822a defines a hole 2829 therethrough for receiving a rock bolt (such as rock bolt 2802 in FIG. 28). The first spacer piece 2822a defines a first recessed annular shoulder 2830 at the first spacer end 2826. The first disc spring 2804 fits over the first spacer end 2826 onto first recessed annular shoulder 2830. The first spacer piece 2822a also defines an outer ring 2831 and second and third recessed annular shoulders 2832 and 2833.

The first housing piece 2824a defines a hole 2834 therethough which through which the first spacer end 2826 protrudes (when assembled). The rim of the hole 2834 fits on over the second recessed annular shoulder 2832 of the spacer 2810. The first housing piece 2824a has a first face 2836a that faces the first disc spring 2804. A ring-shaped ridge 2838a extends upward from the first face 2836a for contacting first disc spring 2804 when compressed. The second housing piece 2824b has a second face 2836b opposite to the first face 2836a that faces the second disc spring 2806 and has a similar ring-shaped ridge 2838b (shown in FIG. 30).

The sensing device 2800 further includes a first conductive ring 2840a, coil springs 2842a and arcuate springs 2844a. The arcuate springs 2844a are a type of "flat spring" in the form of a curved, resilient metal strip. The conductive ring 2840a is positioned under the first face 2836a of the first housing piece 2824a and opposite the ridge 2838a. The coil springs 2842a are spaced apart along the conductive ring 2840a, extending between the conductive ring 2840a and the electronics board 2825. That is, the coil springs 2840a contact the conductive ring 2840a and are connected to the circuitry of the electronics board 2825. The arcuate springs 2844a are also connected to the circuitry of the electronics board 2825 and are spaced apart and aligned with the conductive ring 2840a.

The housing 2808 in this embodiment is deflectable and resilient. Compression of the first disc spring 2804 causes the first disc spring 2804 to press on the ridge 2838a of the housing 2808 and deflects the first face 2836 inward. The arcuate springs 2844a are positioned to extend partially from the electronics board 2825 to the conductive ring 2840a when the housing 2808 is not deflected (i.e. when the first disc spring 2804 is uncompressed). However, inward deflection of the first face 2836a of the housing 2808 pushes the conductive ring 2840a into contact with one or more of the arcuate springs 2844a. The resilient nature of the housing 2808 together with the coil springs 2842a may ensure that, when the first disc spring 2804 becomes uncompressed, the conductive ring 2840a will again separate from the arcuate springs 2844a. Thus, the conductive ring 2840a and the arcuate springs 2844a are electrical contacts that, together with coil springs 2842a, function as a switch that is closed by compression of the first disc spring 2804 (causing the contacts to be engaged).

The first disc spring 2804 in this embodiment compresses to activate the switch described above at a predetermined preload tension. Thus, the first disc spring 2804 in connection with the electrical board 2825, the conductive ring 2840a, coil springs 2842a and the arcuate springs 2844a function as a preload sensor.

The sensing device also includes a second conductive ring 2840b, coil springs 2842b and arcuate springs 2844b that are arranged between the second housing piece 2824b and the electronics board 2825 in manner that mirrors the first conductive ring 2840a, coil springs 2842a and arcuate springs 2844a. The second disc spring 2806 is chosen to compress at an overload tension. Thus, the second conductive ring 2840b and the arcuate springs 2844b are electrical contacts that function as a switch that is closed by compression of the second disc spring 2806 (causing the contacts to be engaged).

In other embodiments, the electrical contacts that engage when the disc spring (or other compressible element) is compressed may not be a ring and/or spring. Other suitable electrical contact structures may be used in which two or more electrical contacts do not engage (open switch) when the compressible element is not compressed and do engage (closed switch) when the compressible element is compressed.

In this example embodiment, a power source (e.g. battery) 2846 for the sensing device 2800 is connected to the electronics board 2825 and held within the housing 2808.

FIG. 30 is a cross-sectional side view of the assembled sensing device 2800 mounted on the rock bolt 2802. In this case, optional plates 2848a and 2848b are used in place of the plates 2812 and 2814 of FIG. 28. The plates 2848a and 2848b in FIG. 30 are smaller and thinner than the plates 2812 and 2814 of FIG. 28. FIG. 30 shows the positioning of the conductive rings 2840a and 2840b, the coil springs 2842a and 2842b, the arcuate springs 2844a and 2844b, the electronics board 2825 and the spacer pieces 2822a and 2822b within the housing 2808.

It is to be understood that the rings 2840a and 2840b, and the springs 2842a, 2842b, 2844a and 2844b are simply one possible embodiment. The structure of the electrical contacts and connections used to provide for switches that are activated by compression of a compressible element (such as a disc spring) may vary. Embodiments are not limited to any particular switching structure. As also mentioned above, non-mechanical switches, such as a proximity sensor, may also be used.

Electrical and sensor functionality of the sensing device 2800 will now be described in more detail with reference to FIGS. 31 to 33.

FIG. 31 shows circuitry 3100 of the sensing device 2800 including microcontroller 2860. The circuitry 3100 may be partially or wholly implemented on the electronics board 2825 shown in FIGS. 29 and 30. The microcontroller 2860 may comprise one or more processors and memory configured to carry out the functionality described herein. For example, the memory may store processor-executable instructions thereon that, when executed, cause the processor to implement the functionality described. Any suitable combination of hardware and software may be used. The microcontroller in this example also includes transmitter circuitry to produce wireless output via antenna (ANT).

Inputs to the microcontroller include vibration interrupt switch input (INT SW); preload switch input (NC SW); and overload switch input (NO SW). In this case, the preload switch is a normally closed (NC) switch, and the overload switch is a normally open (NO) switch.

As will be explained in more detail below, the preload switch input (NC SW), when triggered, indicates a failure of the preload tension (i.e. the first disc spring 2804 in FIG. 30 is not compressed). Thus, the microcontroller 2860 will generate a loss of preload alert signal for transmission by the antenna (ANT). As will be explained in more detail below, the overload switch input (NO SW), when triggered, indicates the rock bolt is overloaded (i.e. the second disc spring 2804 in FIG. 30 is compressed). Thus, the microcontroller 2860 will generate an overload alert signal for transmission by the antenna (ANT). The vibration interrupt switch input (INT SW) in this example is triggered when an onboard accelerometer 2870 (shown in FIG. 32) generates an output indicating vibration (e.g. above a certain threshold). Upon receiving this input, the microcontroller 2860 generates an output signal indicating vibration has been detected.

The microcontroller 2860 may also provide an output ("LED OUT") to drive and/or control one or more LEDs or other light source(s) to provide visual indications as described herein. For example, the microcontroller 2860 may cause an LED to blink when preload is initially established. An LED may also be controlled to show an alert status (e.g. by controlling color, blinking, etc.). The microcontroller has radio circuitry 2861 therein in this embodiment. The radio circuitry 2861 may send output signals to the antenna ANT.

Voltage inputs (VIN) to power the circuitry 3100 and electronic ground connections (GND) are also shown. In some embodiments, the electronic ground may be isolated. The isolated ground may help prevent noise from the installation environment (e.g. rock formation) from affecting the circuitry.

The I2C PWR line shown in FIG. 31 carries power to communication lines on an I2C (Inter-Integrated Circuit) bus between the accelerometer 2870 (FIG. 32) and the microcontroller 2860. Pull up resistors may be disconnected when it is desired for the device sleep to conserve power. Since I2C may require strong pull ups, disconnecting them when the device sleeps may conserve significant power.

Serial Data Line (SDA) and Serial Clock Line (SCL) lines shown in FIG. 31 are the I2C communication bus between the accelerometer 2870 (FIG. 32) and the microcontroller 2860. These lines may provide communication with the accelerometer 2870 to obtain details about sensed vibration. The lines SDA and SCL may also be used to set a vibration threshold during initialization.

Master Clear (MCLR), Program Data (PGD1), and Program Clock (PGC1) input nodes or pins are also shown in FIG. 31 are the device programming pins. These pins may be used for initially loading program code to the microcontroller 2860 device to provide the functionality described herein. For example, the program code may be loaded into the microcontroller 2860 during assembly of the device.

Y1 in this example is a crystal used by the internal radio 2861 to generate a modulation frequency for communication. For example, the frequency may be 933 MHz.

R1 and R2 are pull up resistors on the I2C communication lines of this embodiment. These resistors are used to maintain signal level when either device is not talking.

C1 is a filter capacitor on a power line to the microcontroller 2860, which may reduce noise from oscillating circuits like the crystal Y1.

L1 and L2 are tuning inductors, and C2, C3 and C4 are tuning capacitors and inductors. These inductors L1, L2 and capacitors C2, C3 and C4 may enable the antenna ANT to work at 933 MHz.

FIG. 32 shows circuitry 3200 for generating the vibration interrupt switch signal (INT SW), preload switch signal (NC SW), and the overload switch signal (NO SW) inputs to the microcontroller 2860 in FIG. 31. FIG. 32 shows 3-axis accelerometer 2870, preload switch 2872, overload switch 2874, PNP transistor 2876 with emitter (E), base (B) and collector (C). Dashed line box 2880 illustrates the portion of the circuitry 3200 that may generally be considered a preload sensor. Dashed line box 2882 illustrates the portion of the circuitry 3200 that may generally be considered an overload sensor. With the exception of the mechanical preload switch 2872 and overload switch 2874 of this example, the circuitry 3200 may be partially or wholly implemented on the electronics board 2825 shown in FIGS. 29 and 30.

As mentioned above, the accelerometer 2870 triggers vibration interrupt input (INT SW) if vibration (e.g. vibration above a threshold) is sensed.

The preload switch 2872 comprises the first disc spring 2804, the conductive ring 2840a, the coil springs 2842a and the arcuate springs 2844a in FIG. 30. When the first disc spring 2804 is uncompressed, the preload switch 2872 is open. When the first disc spring 2804 is compressed such that the corresponding conductive ring 2840a contacts one or more of the arcuate springs 2844a, the preload switch 2872 is closed. While the preload switch 2872 is closed power will flow through the preload switch 2872 to the base (B) of the PNP transistor 2876 which keeps the emitter voltage from passing through the transistor. Therefore, in this state, there is no power draw from the voltage input (VN1) due to preload sensor 2880. If the rock bolt 2802 becomes loose, the first disc spring 2804 will flex back opening the preload switch 2872, which cuts power from the base of the PNP transistor 2876. At this point, power will flow through the transistor 2876 and trigger the preload input (NC SW) to the microcontroller 2860 in FIG. 31. Thus, the preload sensor 2880 provides sensor output in the form of the preload switch input (NC SW) to the microcontroller 2860. Resistors R7 and R6 are bias resistors to keep the signals in desired states until the preload switch 2872 changes them. D1, D2 and D3 are a diode to create a 1-way INT SW signal to the microcontroller 2860 and not interfere with other signals.

The overload switch 2874 comprises the second disc spring 2806, the conductive ring 2840b, the coil springs 2842b and the arcuate springs 2844b in FIG. 30. When the second disc spring 2806 is uncompressed, the overload switch 2874 is open. When the second disc spring 2806 is compressed such that the corresponding conductive ring 2840b contacts one or more of the arcuate springs 2844b, the overload switch 2874 is closed. While the overload switch 2874 is open, power will not flow from the voltage input (VIN2). Therefore, in this state there is no power draw caused by the overload sensor. When the rock bolt becomes overloaded the second spring washer 2806 will flatten and close the overload switch 2874 which allows power to flow. At this point the power will flow through the switch 2874 and trigger sensor output in the form of the overload switch input (NO SW) to the microcontroller 2860. R4 is another bias resistor to keep the NO SW signals in a desired state until the overload switch 2874 changes them.

Thus, the preload sensor 2880 and overload sensor 2882 circuitry may only draw power in an alert condition (loss of preload, overload, or accelerometer interrupt in this example). In this manner, power may be conserved to provide for a long life for the sensing device. The microcontroller 2860 (FIG. 31) will remain in a sleep state until one of the above inputs (NC SW, NO SW, or INT SW) is triggered. Once triggered the microcontroller 2860 will wake up and transmit its condition via the antenna (ANT) and/or may flash a specified pattern on the LEDs shown in FIG. 33. The processor will then return to sleep. Based on specified parameters the microcontroller 2860 may continue to wake up and send transmissions and/or flash LEDs until the problem is corrected. The parameters may be pre-programed and/or may be customizable.

As noted above, SDA and SCL are the I2C communication bus between the accelerometer 2870 and the microcontroller 2860 (FIG. 31). C5 is a filter capacitor on the power line (VIN3) to the accelerometer 2870. The capacitor C5 may reduce noise from oscillating circuits like crystal Y1 in FIG. 31.

Input voltage VIN3 to the accelerometer is also shown in FIG. 32.

FIG. 33 shows example LED circuitry 3300 for the sending device 2800. The output signal LED OUT from the microcontroller 2860 in FIG. 31 turns the first and second LEDs (LED1 and LED2) on and off in the desired pattern based on the current state of the device. Though not shown in FIGS. 28 to 30, it will be understood that one or more LEDs or other light sources may be mounted in various positions on the sensing device 2800. R7 and R8 in this example are current limiting resistors that may prevent too much current draw from processor and through LEDs that could possibly damage them.

The electrical circuitry 3100, 3200 and 3300 shown in FIGS. 31 to 33 is provided simply by way of example. Embodiments are not limited to the particular arrangement shown. One or more elements of the circuitry 3100, 3200 and 3300 may be replaced or omitted in other embodiments. Different circuitry to implement the sensing device functionality described herein may also be employed.

It is to be understood that a combination of more than one of the above approaches may be implemented in some embodiments. Embodiments are not limited to any particular one or more of the approaches, methods or apparatuses disclosed herein. One skilled in the art will appreciate that variations, alterations of the embodiments described herein may be made in various implementations without departing from the scope thereof. It is therefore to be understood that within the scope of the appended claims, the disclosure may be practiced otherwise than as specifically described herein.

What has been described is merely illustrative of the application of the principles of the disclosure. Other arrangements and methods can be implemented by those skilled in the art without departing from the scope of the present disclosure.

The invention claimed is:

1. A sensing device for an anchor bolt, the sensing device comprising:
   a spacer having a first end and a second end opposite to the first end, the spacer defining a passage therethrough from the first end to the second end for passage of the anchor bolt;
   at least one load sensor, each said at least one load sensor comprising a respective resilient compressible element positioned at a respective one of the first and second ends of the spacer,
   each said resilient compressible element compressing responsive to a respective load threshold,
   each said at least one load sensor providing a respective sensor output as a function of whether or not the respective resilient compressible element is compressed;
   output means for generating device output indicating a status of the anchor bolt as a function of the sensor output for each said at least one load sensor; and
   a power source for powering the sensing device.

2. The sensing device of claim 1, wherein, for each said at least one load sensor, the load sensor further comprises a respective switch, each said switch comprising two or more electrically conductive contacts positioned such that compression of the resilient compressible element at the respective load threshold moves one of the two electrically conductive contacts to contact at least one other of the electrically conductive contacts, thereby closing the switch.

3. The sensing device of claim 2, further comprising an electronics housing, the housing extending at least partially around the periphery of the spacer, wherein the housing is deflectable and comprises, for each at least one load sensor, a respective outer face that faces the resilient compressible element, and for each said at least one load sensor:
- a first of the two electrically conductive contacts of the respective switch is disposed within the housing adjacent to the outer wall and opposite to the corresponding outer face, and a second of the two electrically conductive contacts is disposed within the housing and spaced apart from the first electrically conductive contacts when the resilient compressible element is uncompressed;
- compression of the resilient compressible element at the respective load threshold causes the resilient compressible element to press against and deflect the outer wall inward such that the first electrically conductive contact engages the second electrically conductive contact.

4. The sensing device of claim 3, wherein for each said load sensor, the first electrically conductive contact comprises an electrically conductive ring.

5. The sensing device of claim 4, wherein the second electrically conductive contact comprises an electrically conductive arcuate spring.

6. The sensing device of claim 2, wherein the electronics housing is detachable and replaceable.

7. The sensing device of claim 1, wherein for each said load sensor, the resilient compressible element comprises a disc spring defining a hole therethrough for passage of the anchor bolt, the hole of the disc spring being aligned with the passage of the spacer.

8. The sensing device of claim 1, wherein the at least one load sensor comprises at least one of:
- a preload sensor, wherein the load threshold for the preload sensor is a preload threshold; and
- an overload sensor, wherein the load threshold for the overload sensor is an overload threshold.

9. The sensing device of claim 8, comprising the preload sensor, wherein the device output indicates that preload is not maintained if the two electrically conductive contacts of the preload sensor are disengaged such that the switch of the preload sensor is open.

10. The sensing device of claim 9, comprising the overload sensor, wherein the device output indicates that the anchor bolt is overloaded if the two electrically conductive contacts of the overload sensor are engaged such that the switch of the preload sensor is closed.

11. The sensing device of claim 9, wherein the overload threshold is higher than the preload threshold.

12. The sensing device of claim 11, wherein, while preload is maintained and the anchor bolt is not overloaded, the output means periodically transmits a signal indicating the status of the anchor bolt as the device output.

13. The sensing device of claim 11, wherein, each said at least one sensor is configured to: draw power in a respective alert condition; and not draw power in a non-alert condition.

14. The sensing device of claim 13, wherein the at least one sensor comprises a preload sensor and the alert condition for the preload sensor is a loss of preload condition.

15. The sensing device of claim 14, wherein the resilient compressible element of the preload sensor being uncompressed indicates the loss of preload condition.

16. The sensing device of claim 15, wherein the at least one sensor comprises an overload sensor and the alert condition for the overload sensor is an overload condition.

17. The sensing device of claim 16, wherein the resilient compressible element of the overload sensor being compressed indicates the overload condition.

18. The sensing device of claim 1, wherein, when the sensing device is attached to the anchor bolt and the anchor bolt is installed in a formation, the sensing device is positioned between a head end of the anchor bolt and the formation.

19. The sensing device of claim 1, further comprising an electronics housing, the housing extending at least partially around the periphery of the spacer, wherein, for each said at least one load sensor, the respective electrical contact protrudes from electronics housing and is positioned such that the respective resilient compressible element engages the electrical contact when substantially compressed.

20. The sensing device of claim 1, wherein the output means comprises one of a transmitter or a light and a visual indicator.

21. The sensing device of claim 1, further comprising a strain gauge for measuring load on the anchor bolt.

22. The sensing device of claim 1, further comprising a sensor that senses at least one of vibrations and seismic activity and wherein the anchor bolt comprises a rock bolt.

23. The sensing device of claim 1, wherein each said load sensor comprises a respective proximity sensor positioned to trigger when the corresponding resilient compressible element of the load sensor is compressed.

* * * * *